(12) United States Patent
Shiga

(10) Patent No.: US 8,049,992 B2
(45) Date of Patent: Nov. 1, 2011

(54) TAPE REEL, RECORDING TAPE CARTRIDGE, TAKE-UP REEL, PULLOUT MEMBER, AND DRIVE DEVICE HAVING A RECORDING TAPE WOUND THEREIN

(75) Inventor: Hideaki Shiga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 888 days.

(21) Appl. No.: 12/015,296

(22) Filed: Jan. 16, 2008

(65) Prior Publication Data

US 2008/0174912 A1 Jul. 24, 2008

(30) Foreign Application Priority Data

Jan. 19, 2007 (JP) ................................ 2007-010834

(51) Int. Cl.
*G11B 23/087* (2006.01)
*G03B 23/02* (2006.01)
(52) U.S. Cl. ..................................... 360/132; 242/332.4
(58) Field of Classification Search .................. 360/132; 242/332.4, 348, 613, 613.1
See application file for complete search history.

(56) References Cited

U.S. PATENT DOCUMENTS

| 5,316,236 | A | * | 5/1994 | Hasegawa et al. ............. 242/336 |
| 5,474,253 | A | | 12/1995 | Kasetty et al. |
| 6,398,143 | B1 | * | 6/2002 | Kim et al. ..................... 242/332.4 |
| 6,643,096 | B2 | * | 11/2003 | Ashikawa et al. ............. 360/132 |
| 6,729,570 | B1 | * | 5/2004 | Murao et al. .................... 242/345 |
| 6,764,038 | B2 | * | 7/2004 | Morita et al. ............... 242/348.2 |
| 7,092,199 | B2 | * | 8/2006 | Nakamura et al. .......... 360/77.12 |
| 7,243,877 | B1 | * | 7/2007 | Anderson ....................... 242/614 |
| 7,350,731 | B2 | * | 4/2008 | Hiraguchi .................... 242/338.1 |
| 7,407,125 | B2 | * | 8/2008 | Shiga ........................... 242/332.4 |
| 7,540,444 | B2 | * | 6/2009 | Shiga ........................... 242/346.2 |
| 7,677,488 | B2 | * | 3/2010 | Hiraguchi .................... 242/338.1 |
| 7,802,751 | B2 | * | 9/2010 | Shiga ........................... 242/613.4 |
| 2003/0099064 | A1 | * | 5/2003 | Ashikawa et al. ............. 360/132 |

(Continued)

FOREIGN PATENT DOCUMENTS

EP 0 588 219 A2 3/1994

(Continued)

OTHER PUBLICATIONS

Notice of Reasons for Rejection, dated Nov. 2, 2010, issued in corresponding JP Application No. 2007-010834, 4 pages in English and Japanese.

(Continued)

*Primary Examiner* — Angel A. Castro
(74) *Attorney, Agent, or Firm* — Sughrue Mion, PLLC

(57) ABSTRACT

The present invention provides a tape reel, a recording tape cartridge, a take-up reel, a pullout member and a drive device that can control fluctuation of a recording tape in the axial direction of a hub and can, even when the recording tape is thinned in accompaniment with an increase in recording capacity, prevent the occurrence of tape edge damage. A tape reel 20 includes: a hub 22 on which is wound a recording tape T on which is recorded servo signals S that are a reference for tracking by a recording/playback head 88 of a drive device 70; and flanges 24 and 26 provided integrally at both end portions of the hub 22, wherein the diameter of a substantially central portion of the hub 22 is formed larger than the diameters of each of the end portions of the hub 22.

11 Claims, 12 Drawing Sheets

U.S. PATENT DOCUMENTS

2006/0202076 A1    9/2006    Miura et al.

FOREIGN PATENT DOCUMENTS

| | | |
|---|---|---|
| EP | 1 128 376 A2 | 8/2001 |
| EP | 1 583 097 A2 | 10/2005 |
| EP | 1 643 492 A1 | 4/2006 |
| EP | 1 775 727 A2 | 4/2007 |
| JP | 06-309837 A | 11/1994 |
| JP | 08-315540 | 11/1996 |
| JP | 2002-251859 A | 9/2002 |
| JP | 2003-168278 A | 6/2003 |
| JP | 2005-251283 A | 9/2005 |
| JP | 2005-259240 A | 9/2005 |
| JP | 2005-276387 A | 10/2005 |

OTHER PUBLICATIONS

Final Rejection, dated May 24, 2011, issued in corresponding JP Application No. 2007-010834, 6 pages in English and Japanese.

* cited by examiner

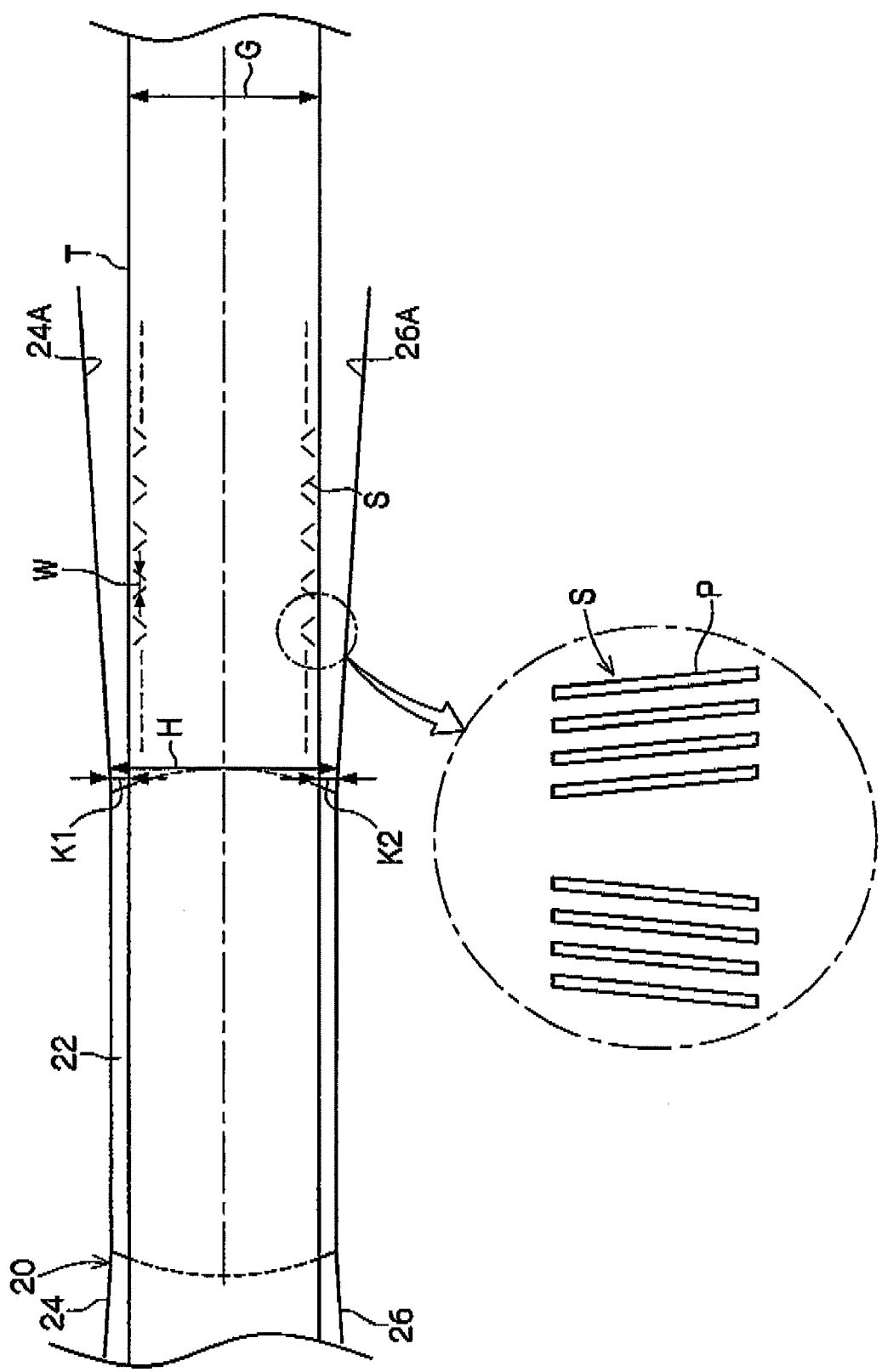

TAPE REEL, RECORDING TAPE CARTRIDGE, TAKE-UP REEL, PULLOUT MEMBER, AND DRIVE DEVICE HAVING A RECORDING TAPE WOUND THEREIN

CROSS-REFERENCE TO RELATED APPLICATION

This application claims priority under 35 USC 119 from Japanese Patent Application No. 2007-010834, the disclosure of which is incorporated by reference herein.

BACKGROUND OF THE INVENTION

1. Field of the Invention

The present invention relates to a tape reel and a take-up reel on which is wound a recording tape, such as a magnetic tape or the like, which is used as a recording/playback medium mainly of computers or the like, and to a recording tape cartridge which accommodates the tape reel within a case, to a pullout member which pulls out the recording tape from the recording tape cartridge and is accommodated in the take-up reel, and to a drive device which is provided with the take-up reel and into which the recording tape cartridge is loaded.

2. Description of the Related Art

There are conventionally known recording tape cartridges in which a recording tape, such as a magnetic tape or the like which is used as a data recording/playback medium (for data backup) of computers or the like, is wound on the hub (core portion) of a reel (tape reel), and the reel is singly accommodated within a case. When the recording tape cartridge is loaded into a drive device, the recording tape is pulled out via a leader member from an opening provided in the recording tape cartridge. The pulled out recording tape is, via tape guides and a recording/playback head, taken-up onto a take-up reel within the drive device.

In the recording tape cartridge of this configuration, an increase in the recording capacity of the recording tape is always desired. The main factors supporting the increase in the recording capacity of the recording tape include: (1) improving recording density (improving linear recording density, improving track density); (2) increasing recording area (increasing the tape length by thinning the recording tape); (3) improving servo tracking control; and (4) increasing the traveling speed of the recording tape.

However, there are the following problems in the aforementioned (1) to (4), and solutions for those problems are continuously sought after. In particular, ensuring that tape edge damage with respect to an impact when the recording tape cartridge is dropped or the like when the recording tape cartridge is not in use (during transport, during handling) can be reduced and ensuring that tape edge damage during travel of the recording tape when the recording tape cartridge is in use (when the recording tape cartridge has been loaded into a drive device) are sought after.

(1) When recording density improves, the recording size of the data signal also becomes smaller, and the allowable amount of fluctuation in the width direction of the recording tape during travel inside the drive device, and particularly fluctuation at a high frequency (fluctuation in a short amount of time), becomes smaller. That is, when the recording tape fluctuates significantly in its width direction during travel, the recording/playback head that moves in the width direction of the recording tape on the basis of servo signals on the recording tape becomes unable to follow a sudden fluctuation in the position of the recording tape, errors in reading servo signals occur, and it becomes unable to record and play back the desired data signal.

(2) When the recording tape is thinned, the edge strength of the recording tape drops and it becomes easier for the recording tape to sustain tape edge damage. That is, when the recording tape cartridge sustains an impact during transport or as a result of the recording tape cartridge being dropped or the like, it becomes easier for the edge of the recording tape protruding from the wound surface of the reel to hit flanges and bend. Further, due to thinning of the recording tape, the allowable stress of the recording tape with respect to pressure applied to the recording tape drops when the recording tape is wound on the reel or when the recording tape is stored over a long period of time.

(3) When the size of the servo signal becomes smaller or the recording density of the servo signal itself improves and servo tracking control improves, the allowable amount of fluctuation in the width direction of the recording tape during travel inside the drive device, and particularly fluctuation at a high frequency (fluctuation in a short amount of time), becomes smaller. That is, when the recording tape fluctuates significantly in its width direction during travel, the recording/playback head that moves in the width direction of the recording tape on the basis of servo signals on the recording tape becomes unable to follow a sudden fluctuation in the position of the recording tape, errors in reading servo signals occur, and it becomes unable to record and play back the desired data signal.

When the traveling speed of the recording tape is increased, there is no longer leeway with respect to the response speed of servo tracking control. Further, there is the potential to induce high-frequency vibration. Further, the impact force when the edge of the recording tape contacts flanges of a take-up reel or tape guides of the drive device and moreover flanges of the reel of the recording tape cartridge becomes greater, which becomes disadvantageous to recording tape that has been tinned and whose edge has become weaker.

It is commonly understood that the rigidity of recording tape is affected in cube by a reduction in its thickness. For example, when the thickness of the recording tape is from 8.9 μm to 6.6 μm, it is $6.6^3 \div 8.93^3 = 0.41$ with respect to $6.6 \div 8.9 = 0.74$, and when the thickness is reduced 26%, the rigidity is reduced 59%. There is a tendency for recent recording tape to be thinned in order to increase recording capacity per one recording tape cartridge, and there is concern for a drop in rigidity, that is, a drop in edge strength, and susceptibility to plastic deformation.

Further, as described in Japanese Patent Application Laid-Open (JP-A) No. 2005-251283, for example, it has conventionally been disclosed that the wound shape (wound surface) is regulated (regulated windability is improved) in a reel where, as the recording tape is wound on the reel, the hub diameter on one end side of the outer peripheral surface of the hub becomes smaller with respect to the hub diameter on the other end side. However, when a difference in diameter is given to both end portions of the hub and the recording tape is set toward one side, there is the potential for the recording tape to be excessively set toward one flange side due to a combination with the curvature (curvature in the width direction) of the recording tape, whereby there is the potential for the edge of the recording tape to strongly contact flanges or tape guides of the drive device (the potential for tape edge damage to occur).

Further, as described in JP-A No. 6-309837, for example, causing the width direction central portion of the hub to swell (in a convex shape) into a substantially barrel shape in a reel or the like on which recording tape is wound has conventionally been disclosed. In this JP-A No. 6-309837, a helical scan rotating head is disclosed. In this rotating head, the contact angle/contact area with the recording tape is large and the traveling speed of the recording tape is also slow, so control of the width direction position of the recording tape is relatively easy in comparison to a linear recording fixed head, and it is relatively easy to control by the travel system of the drive device.

However, in a rotating head where the contact angle is large and the head is slanted, there is the problem that when it is loaded into a rotating drum, the edge of the recording tape catches on the head and damage occurs to the recording tape. In order to solve this, in JP-A No. 6-309837, correcting the value of the cupping amount in a negative direction when cupping of the recording tape is large (in this JP-A No. 6-309837, when cupping is positive) is disclosed.

That is, large positive cupping of the recording tape is corrected to a small positive, ±0, slightly negative by a substantially barrel-shaped hub. Thus, a situation where the edge of the recording tape catches on the rotating head and damage occurs to the recording tape is prevented, and alignment with respect to the head is improved.

However, when the recording tape is thinned, with the large swelling amount of the barrel shape disclosed in JP-A No. 6-309837, deformation in an undulating shape and cinching occur in the tape edge (though this is not expressly stated in JP-A No. 6-309937). According to an experiment by the present applicant, the swelling amount of the barrel shape of the occurrence boundary thereof was around 0.08 mm when recording tape having a thickness of 6.6 μm, for example, was wound on a hub having a wall thickness of 2.5 μm and made of 10% glass fiber-reinforced PC resin. That is, when it becomes larger than this, deformation in an undulating shape and cinching would occur.

SUMMARY OF THE INVENTION

The present invention has been made in view of the above circumstances and provides a tape reel, a recording tape cartridge, a take-up reel, a pullout member, and a drive device.

A first aspect of the present invention provides a tape reel comprising: a hub on which is wound a recording tape on which is recorded a servo signal that is a reference for tracking by a recording/playback head of a drive device; and flanges provided integrally at both end portions of the hub, wherein a diameter of a substantially central portion of the hub is formed larger than diameters of each of the end portions of the hub.

A second aspect of the present invention provides a recording tape cartridge comprising: the tape reel of the first aspect; and a case accommodating the tape reel rotatably.

A third aspect of the present invention provides a take-up reel provided within a drive device and on which is wound a recording tape pulled out from a recording tape cartridge, the take-up reel comprising: a hub on which is wound a recording tape on which is recorded a servo signal that is a reference for tracking by a recording/playback head of a drive device; and flanges provided integrally at both end portions of the hub, wherein a diameter of a substantially central portion of the hub is formed larger than diameters of each of the end portions of the hub.

A fourth aspect of the present invention provides a pullout member that pulls out a recording tape from a recording tape cartridge, is accommodated in a hub of the take-up reel of the third aspect, and comprises a take-up surface that configures part of an outer peripheral surface of the hub, wherein a diameter of a substantially central portion of the take-up surface is formed larger than diameters of each of the end portions of the take-up surface.

A fifth aspect of the present invention provides a drive device in which a recording tape cartridge is loaded, comprising: the take-up reel of the third aspect on which is wound a recording tape pulled out from the recording tape cartridge; and a recording/playback head.

BRIEF DESCRIPTION OF THE DRAWINGS

Embodiments of the present invention will be described in detail based on the following figures, wherein:

FIG. 6 is a schematic side view showing servo signals of a recording tape;

DETAILED DESCRIPTION OF THE ON

Figure 4:
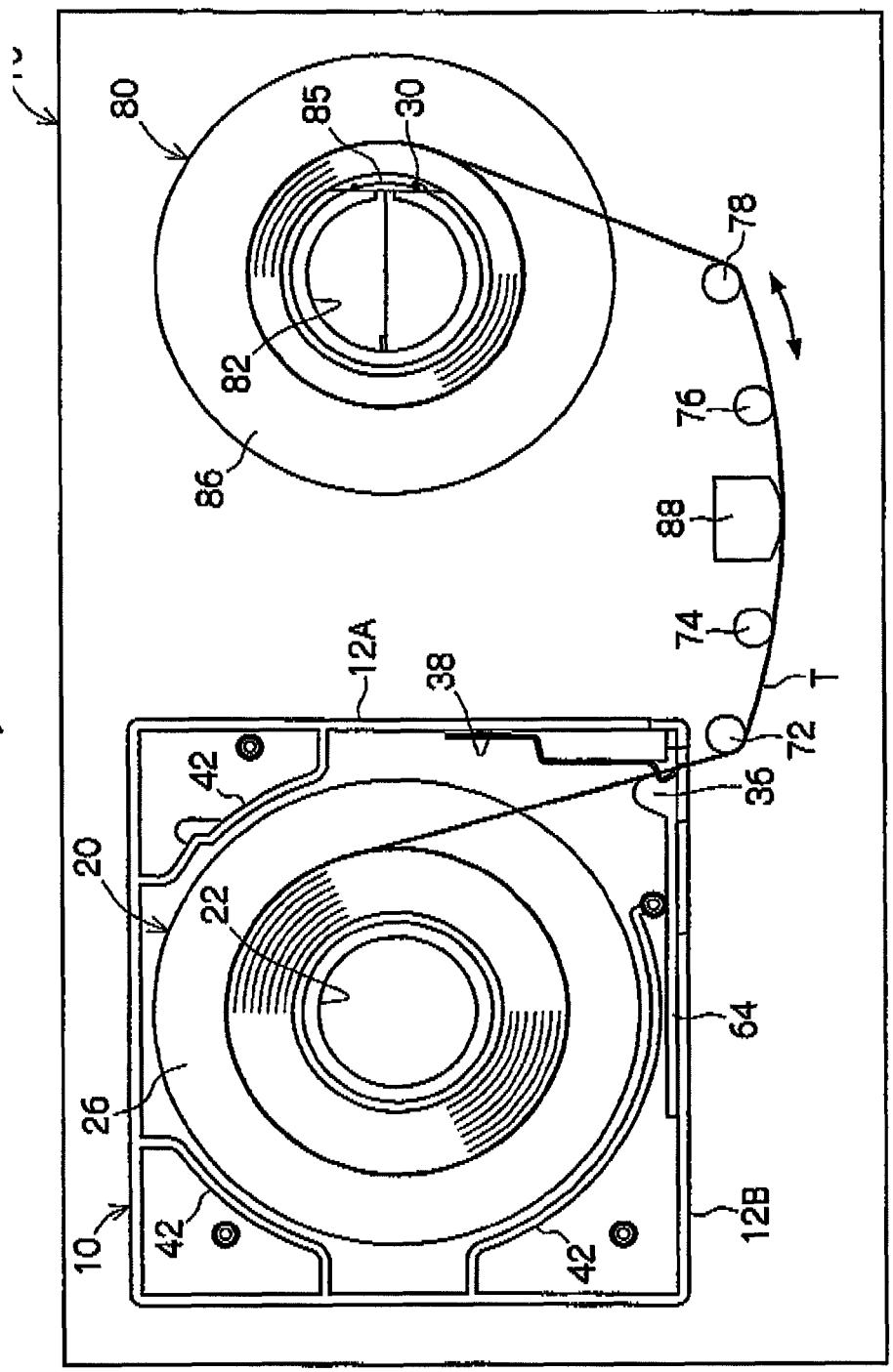
FIG. 4 is a schematic plan view of a drive device after the recording tape cartridge has been loaded therein.

Herebelow, an example of an exemplary embodiment of the present invention will be described in detail with reference to the drawings. Note that, for convenience of explanation, in FIG. 1, the direction of loading a recording tape cartridge 10 into a drive device 70 (see FIG. 4) is denoted by arrow A, and this direction of arrow A is the forward direction (front side) of the recording tape cartridge 10. The direction of arrow B, which is orthogonal to arrow A, is the rightward direction (right side). Further, the direction of arrow C is the width direction in the present exemplary embodiment, and is the same direction as the vertical direction and the heightwise direction, as well as the axial direction of a reel 20 (a reel hub 22) and a take-up reel 80 (a reel hub 82).

Figure 1:
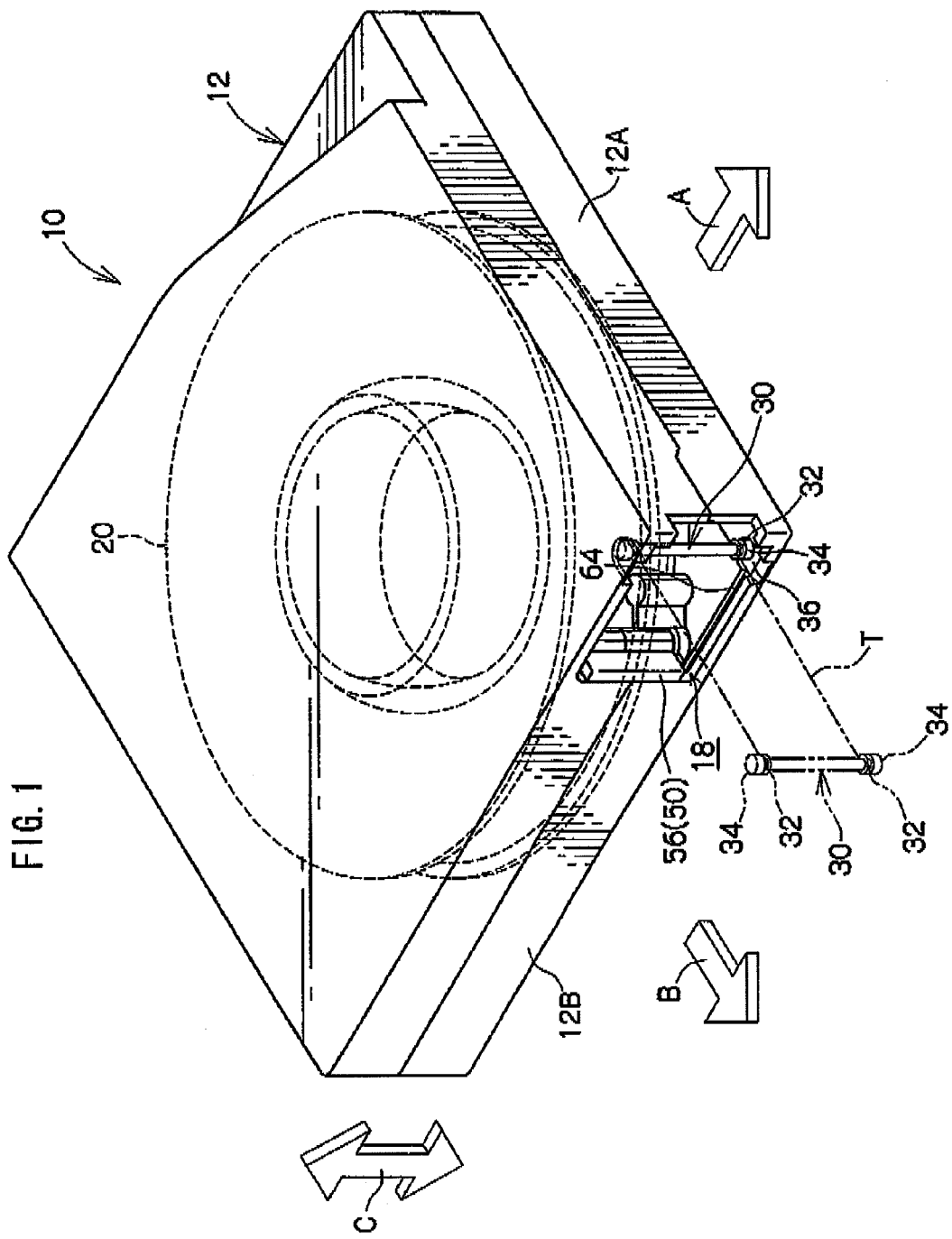
FIG. 1 is a schematic perspective view of a recording tape cartridge relating to a present embodiment.
Figure 2:
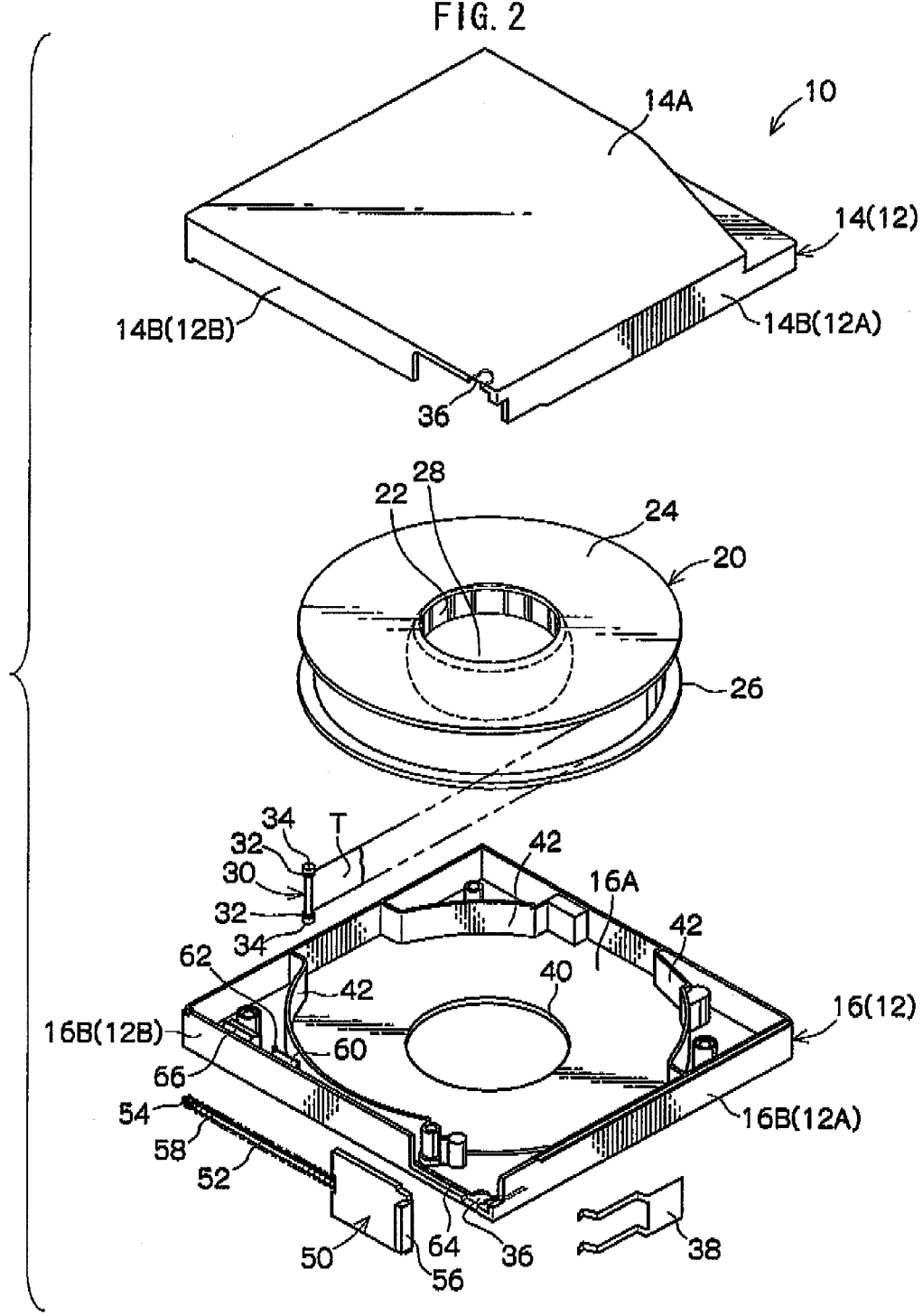
FIG. 2 is a schematic exploded perspective view of the recording tape cartridge relating to the present embodiment.

As shown in FIG. 1 and FIG. 2, the recording tape cartridge 10 has a case 12 which is substantially shaped as a rectangular box. The case 12 is structured by an upper case 14 and a lower case 16, which are made of a resin such as polycarbonate (PC) or the like, being joined together by ultrasonic welding, screws or the like in a state in which a peripheral wall 14B, which stands erect at the peripheral edge of a ceiling plate 14A, and a peripheral wall 16B, which stands erect at the peripheral edge of a floor plate 16A, are abutting one another.

Only one of the reel (tape reel) 20 is rotatably accommodated within the case 12. The reel 20 has the reel hub 22 which is formed in a substantially cylindrical shape having a floor and which structures the axially central portion (core portion) of the reel 20, an upper flange 24 provided at the upper end portion of the reel hub 22, and a lower flange 26 provided at the lower end portion of the reel hub 22. The lower flange 26 and the reel hub 22 are molded integrally. Further, the upper flange 24 which is annular is ultrasonically welded to and structured integrally with the upper end portion of the reel hub 22.

That is, the reel 20 has a configuration where the reel hub 22 and the upper and lower flanges 24 and 26 are integrally structured and where the upper and lower flanges 24 and 26 also deform in accompaniment with deformation of the reel hub 22 resulting from the tight-winding of the recording tape T (the opposite is also possible; in other words, deformation of the reel hub 22 and deformation of the upper and lower flanges 24 and 26 are linked to/affect each other).

Figure 13A:
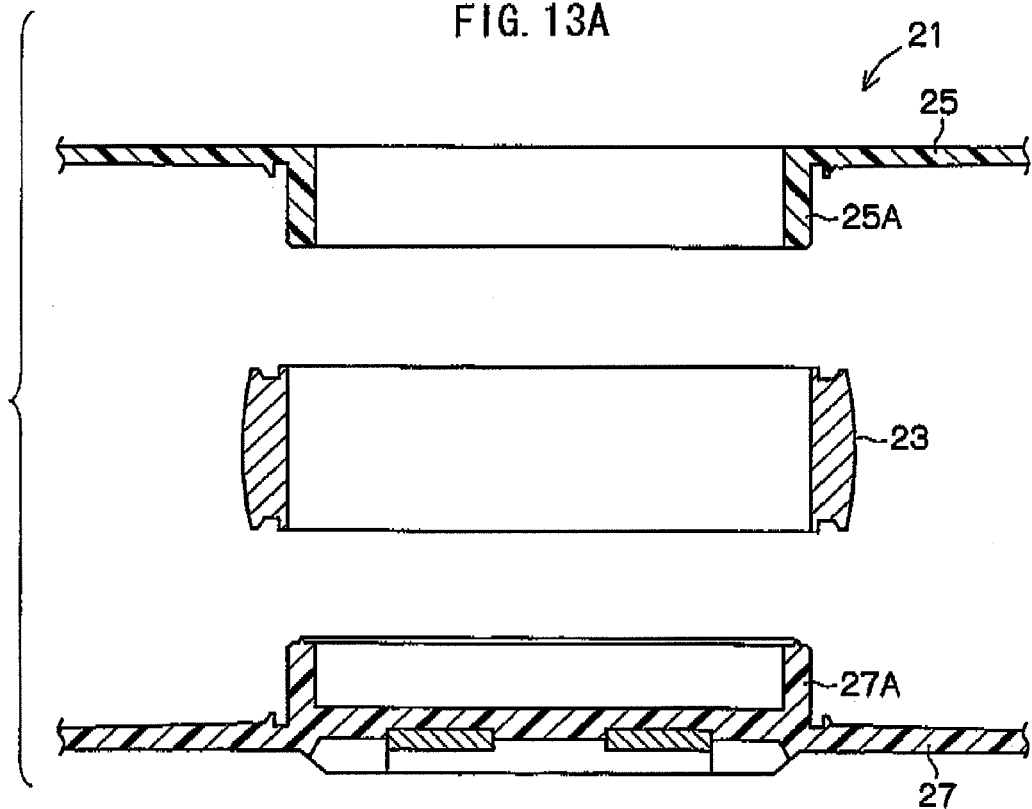
FIG. 13A is a schematic exploded side cross-sectional view showing an example of a reel having a configuration that is different from that of the present exemplary embodiment.
Figure 13B:
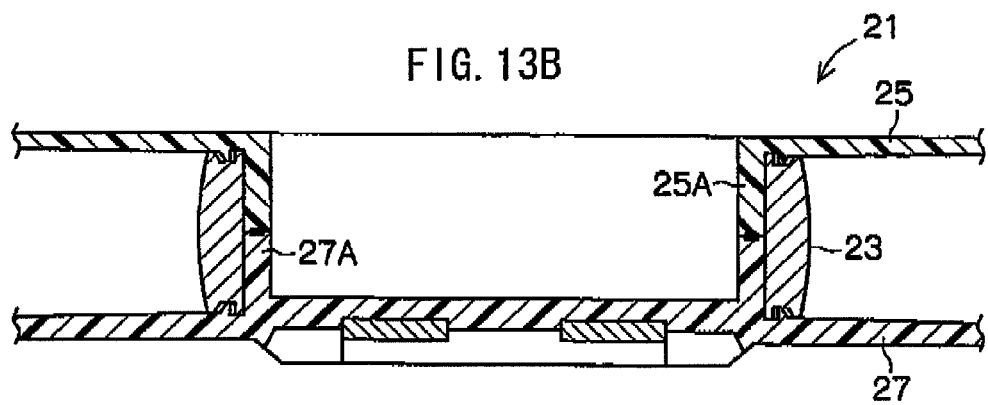
FIG. 13B is a schematic exploded side cross-sectional view showing an example of a reel having a configuration that is different from that of the present exemplary embodiment.

Incidentally, a reel of a configuration that is not integrated is a reel 21 such as shown in FIGS. 13A and 13B. The reel 21 has a configuration where a cylinder portion 25A of an upper flange 25 and a cylinder portion 27A of a lower flange 27 are welded to each other, a reel hub 23 is fitted at the outer sides of the cylinder portions 25A and 27A, and the reel hub 23 and the upper and lower flanges 25 and 27 are mutually independent (or close to that independent state). For that reason, in the reel 21, deformation of the reel hub 23 and deformation of the upper and lower flanges 25 and 27 are not linked to/do not affect each other (or are difficult to be linked to/affect each other), or in other words, the upper and lower flanges 25 and 27 do not deform (or are difficult to deform) even when the reel hub 23 deforms.

The recording tape T, which is a magnetic tape or the like and serves as an information recording/playback medium, is wound on the outer peripheral surface of the reel hub 22 at a predetermined tight-winding force F (e.g., F=0.588 N to 0.980 N). The width of the fluctuation in the width direction of the wound recording tape T is restricted by the upper flange 24 and the lower flange 26. Note that the mutually-opposing surfaces of the upper flange 24 and the lower flange 26 are taper surfaces 24A, 26A (see FIG. 3) at which the interval between the flanges gradually increases toward the outer side (the outer peripheral edge side).

Note that, in order to increase the recording capacity, the thickness of the recording tape T is made to be less than or equal to 7.5 μm, and preferably less than or equal to 6.9 μm. Moreover, a total clearance K (K=k1+k2) of upper and lower clearances k1 and k2 determined by subtracting a width (in this case, ½ inch, 12.65 mm) G of the recording tape T prescribed by the drive device 70 side from a distance (innermost flange interval) H between the upper and lower flanges 24 and 26 at the outer peripheral surface of the reel hub 22 is set such that K=0.10 mm to 0.18 mm (see FIG. 6).

The clearance K is actually determined by adhering the recording tape T to the surface of the reel hub 22, setting one edge of the recording tape T toward either the upper or lower flange such as the one flange 24 and measuring the clearance between the other edge of the recording tape T and the other flange 26, or by measuring the width of the recording tape T and the flange interval at the reel hub 22 and subtracting the former from the latter, but the latter measuring method is practical.

Further, as shown in detail in FIG. 3, the configuration of the reel hub 22 is made to be a substantially barrel-shaped configuration (hereinafter called "crowning shape" upon occasion) in which, when seen from a side view, the substantially central portion in the width direction swells-out in an arc shape for example (but is not limited to an arc shape). That is, the outer diameter of the width direction substantially central portion of the reel hub 22 is formed so as to gradually become larger from the outer diameters of the upper and lower both end portions. It is desirable that the outer diameters of the upper and lower both end portions of the reel hub 22 be the same at the upper flange 24 side and the lower flange 26 side, but do not necessarily have to be the same, and it suffices for them to be smaller than the outer diameter of the substantially central portion in the width direction.

The crowning amount (convex amount) ΔR, which is the difference between the radius of the maximum diameter portion (the substantially central portion in the width direction) of the reel hub 22 and the radius which is the larger of the radii of the upper and lower both end portions, is $\Delta R \leq 0.08$ mm, and preferably $\Delta R \leq 0.064$ mm. Further, a ratio J (J=ΔR/G) of the crowning amount ΔR with respect to a width G of the recording tape T which is prescribed at the drive device 70 side (12.65 mm in this case) is $J \leq 0.0063$, and preferably $J \leq 0.0050$.

Figure 12:
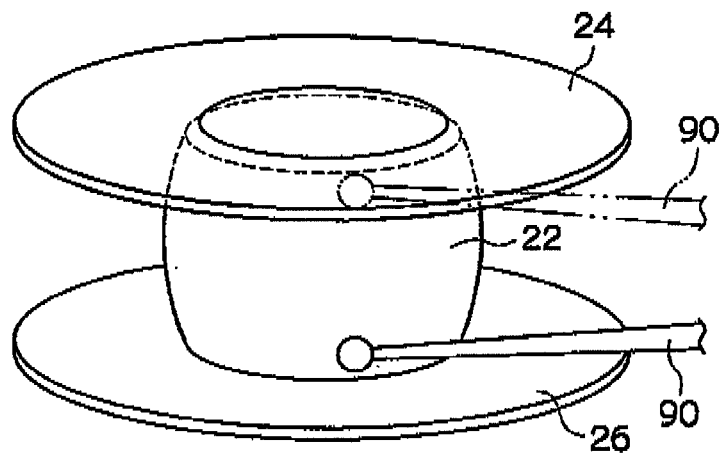
FIG. 12 is a schematic perspective view for explaining a method of measuring the radius of the reel.

A method of measuring the aforementioned crowning amount (convex amount) ΔR will be described next. As shown in FIG. 12, the reel 20 is set on an unillustrated master chucking gear (a highly-accurate reference gear) such that a chucking portion (a reel gear 44 which will be described later) of the reel 20 which is chucked by the drive device 70 is directed downward. Then, in this state, the outer shape of the reel hub 22 is measured from the lower end portion side to the upper end portion side by a touch sensor probe 90 of a contact-type three-dimensional measuring device.

At this time, the provisional center (axial center) at the time of measuring the radius of the reel hub 22 is the center (axial center) of the master chucking gear. Further, because the touch sensor probe 90 which has a diameter of 1 mm is used, the positions of upper end portion and the lower end portion of the measurement positions are set such that the central positions thereof at the time of measurement are within ranges of 0.7 mm to 1.0 mm from the upper end portion and the lower end portion of the reel hub 22 respectively, so that the touch sensor probe 90 does not interfere with the upper flange 24 or the lower flange 26. The measurement points are set at substantially uniform intervals such that the total number thereof is at least 10. This measurement is carried out in the same way at six places which are at 60° intervals.

From these results, the crowning amount ΔR=(ΔRmax+ΔRmin)/2 of the reel hub 22 is computed. Note that ΔRmax is the maximum value of ΔR1 through ΔR6, and ΔRmin is the minimum value of ΔR1 through ΔR6. Further, ΔR1 through ΔR6 are Rnmax−(the greater of the radius values among the radius values of the upper end portion and the lower end portion) (n=1 to 6), at each of the positions of the six places which are at the 60° intervals. Moreover, R1max through R6max are the maximum values among the measured values of the radius at the positions of the six places at the 60° intervals, which are measured by the above-described method.

Figure 3:
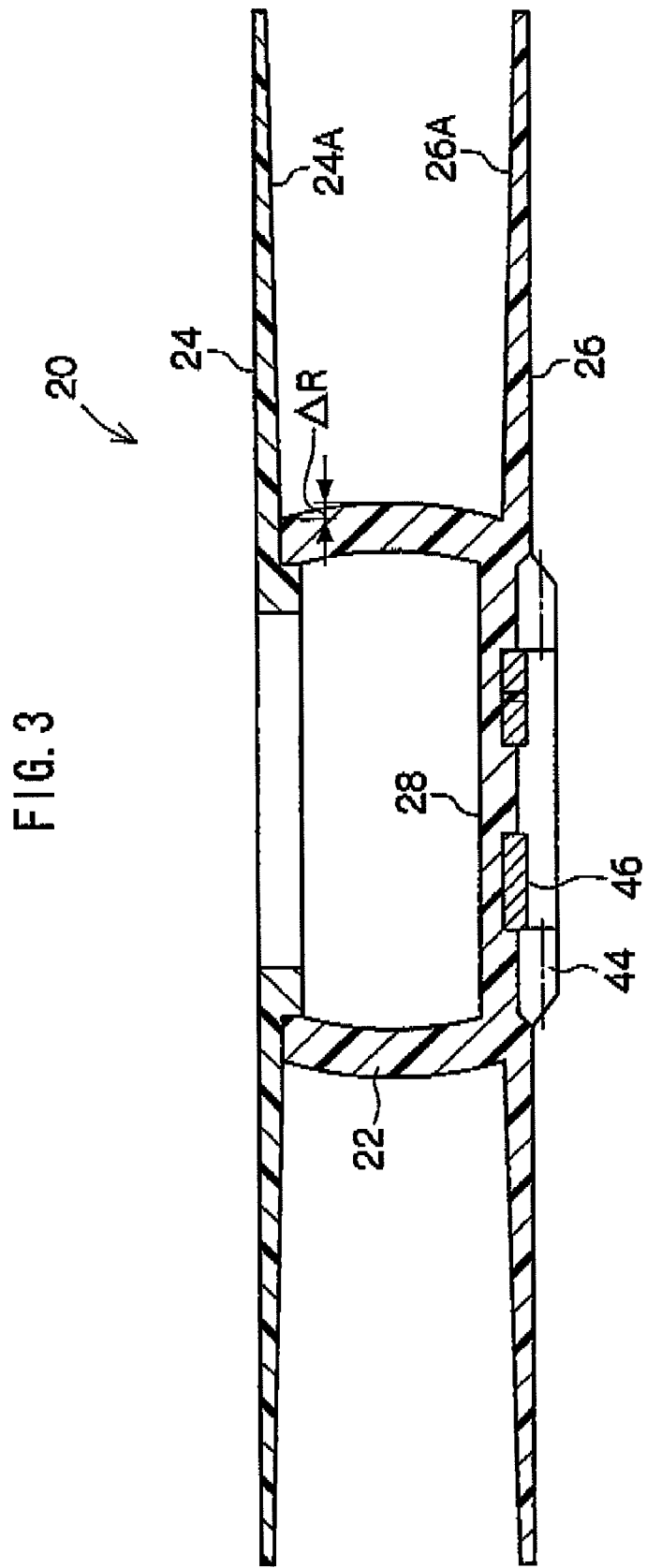
FIG. 3 is a schematic side cross-sectional view of a reel relating to the present embodiment.

On the other hand, as shown in FIG. 3, the reel gear 44 is formed in an annular shape at the lower surface of a floor wall 28 of the reel hub 22. A gear opening 40, which is for exposing the reel gear 44 to the exterior, is formed in the central portion of the lower case 16 (see FIG. 2). The reel gear 44, which is exposed from this gear opening 40, meshes-together with a driving gear (not shown) of the drive device 70 (see FIG. 4 and FIG. 5), and is driven and rotated. In this way, the reel 20 is able to rotate relative to the case 12 within the case 12.

A reel plate 46, which is formed in an annular shape of a magnetic material, is fixed by insert molding or the like to the lower surface of the floor wall 28 at the radial direction inner side of the reel gear 44. The reel plate 46 is attracted and held by the magnetic force of an annular magnet (not shown) of the drive device 70. Further, the reel 20 is held so as to not joggle by play restricting walls 42 which serve as inner walls which project-out locally at the inner surfaces of the upper case 14 and the lower case 16 and are on circular loci which are coaxial with the gear opening 40 (see FIG. 2).

Further, as shown in FIG. 1 and FIG. 2, an opening 18 for the pulling-out of the recording tape T wound on the reel 20 is formed in a right wall 12B of the case 12. A leader pin 30, which is pulled out and operated while being anchored (engaged) by a leader block 85 (see FIG. 7A and FIG. 7B) which serves as a pullout member of the drive device 70, is fixed to the free end portion of the recording tape T which is pulled out from the opening 18. Annular grooves 32 are formed in the both end portions of the leader pin 30 which project-out further than the width direction end portions of the recording tape T. These annular grooves 32 are anchored by books 85A or the like of the leader block 85 (see FIG. 7A and FIG. 7B).

Further, a pair of upper and lower pin holding portions 36 are provided at the inner side of the opening 18 of the case 12, i.e., at the inner surface of the ceiling plate 14A of the upper case 14 and the inner surface of the floor plate 16A of the lower case 16. The pin holding portions 36 position and hold the leader pin 30 within the case 12. The pin holding portions 36 are formed in substantially semicircular shapes whose recording tape T pull-out sides are open. Both end portions 34 of the leader pin 30, which is in an upright state, can enter into and exit from the pin holding portions 36 from these open sides.

A leaf spring 38 is disposed and fixed in a vicinity of the pin holding portions 36. The distal end portions of a bifurcated portion of the leaf spring 38 respectively engage with the upper and lower end portions 34 of the leader pin 30, such that the leader pin 30 is held in the pin holding portions 36. Note that, when the leader pin 30 is to enter into or exit from the pin holding portions 36, the distal end portions of the leaf spring 38 are appropriately elastically deformed so as to permit movement of the leader pin 30.

The opening 18 is opened and closed by a door 50. The door 50 is structured as a substantially rectangular plate of a size which can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widened portion 54, which prevents the coil spring 58 from falling-off, is formed at the rear end of the shaft 52. A supporting stand 60, which has an anchor portion 62 which anchors the rear end of the coil spring 58 which is fit around the shaft 52, projects from the lower case 16.

Accordingly, due to the shaft 52 being supported so as to be freely slidable on the supporting stand 60 and the rear end of the coil spring 58 being anchored on the anchor portion 62, the door 50 is always urged in the direction of closing the opening 18 by the urging force of the coil spring 58. Note that it is preferable that a supporting stand 66, which supports the shaft 52 when the opening 18 is open, be formed so as to project-out at the rear side of the supporting stand 60.

A convex portion 56 for opening/closing operation projects outwardly from the front end portion of the door 50. The convex portion 56 engages with an opening/closing member (not shown) of the drive device 70 as the recording tape cartridge 10 is loaded into the drive device 70. The door 50 is thereby opened against the urging force of the coil spring 58.

An example of the drive device 70 into which the recording tape cartridge 10 is loaded will be described next. As shown in FIG. 4 through FIG. 7B, the drive device 70 has the take-up reel 80 on which the recording tape T, which has been pulled out from the recording tape cartridge 10 via the leader pin 30, is wound.

The take-up reel 80 has substantially the same structure as the reel 20. Namely, the take-up reel 80 has a reel hub 82 which is formed in a substantially cylindrical shape having a floor and which structures the axially central portion (core portion) of the take-up reel 80, an upper flange 84 provided at the upper end portion of the reel hub 82, and a lower flange 86 provided at the lower end portion of the reel hub 82. The lower flange 86 and the reel hub 82 are molded integrally.

The upper flange 84 is structured integrally with the upper end portion of the reel hub 82 by being screwed (fixed) thereto via a metal retainer plate (not shown). Accordingly, at the take-up reel 80, the upper and lower flanges 84 and 86 also deform in accompaniment with deformation of the reel hub 82 resulting from the tight-winding of the recording tape T (deformation of the reel hub 82 and deformation of the upper and lower flanges 84 and 86 are linked to/affect each other).

The recording tape T can be wound on the outer peripheral surface of the reel hub 82, and the width of the fluctuation in the width direction of the wound recording tape T is restricted by the upper flange 84 and the lower flange 86. Note that the mutually-opposing surfaces of the upper flange 84 and the lower flange 86 are taper surfaces 84A, 86A (see FIG. 5) at which the interval between the flanges gradually increases toward the outer side (the outer peripheral edge side).

Moreover, a total clearance K (K=k1+k2) of upper and lower clearances k1 and k2 determined by subtracting a width (12.65 nm) G of the recording tape T from a distance (innermost flange interval) H between the upper and lower flanges 84 and 86 at the outer peripheral surface of the reel hub 22 is set such that K=0.10 mm to 0.18 nm (see FIG. 6). These points as well are the same as in the case of the reel 20.

Further, as the same as in the case of the reel hub 22, the configuration of the reel hub 82 is made to be a substantially barrel-shaped configuration (crowning shape) in which, when seen from a side view, the substantially central portion in the width direction swells out in an arc shape for example (but is not limited to an arc shape). That is, the outer diameter of the width direction substantially central portion of the reel hub 82 is formed so as to gradually become larger from the outer diameters of the upper and lower both end portions.

Figure 7A:
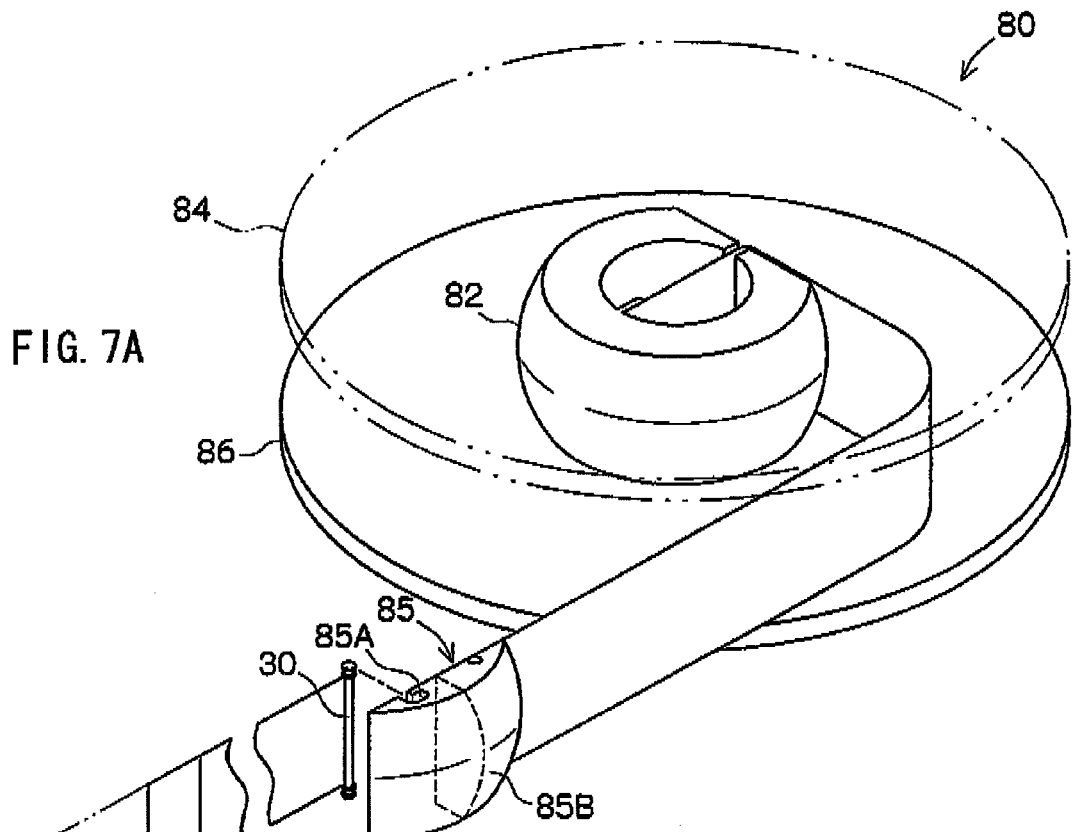
FIG. 7A is a schematic perspective view showing the structure of a leader block of a take-up reel.
Figure 7B:
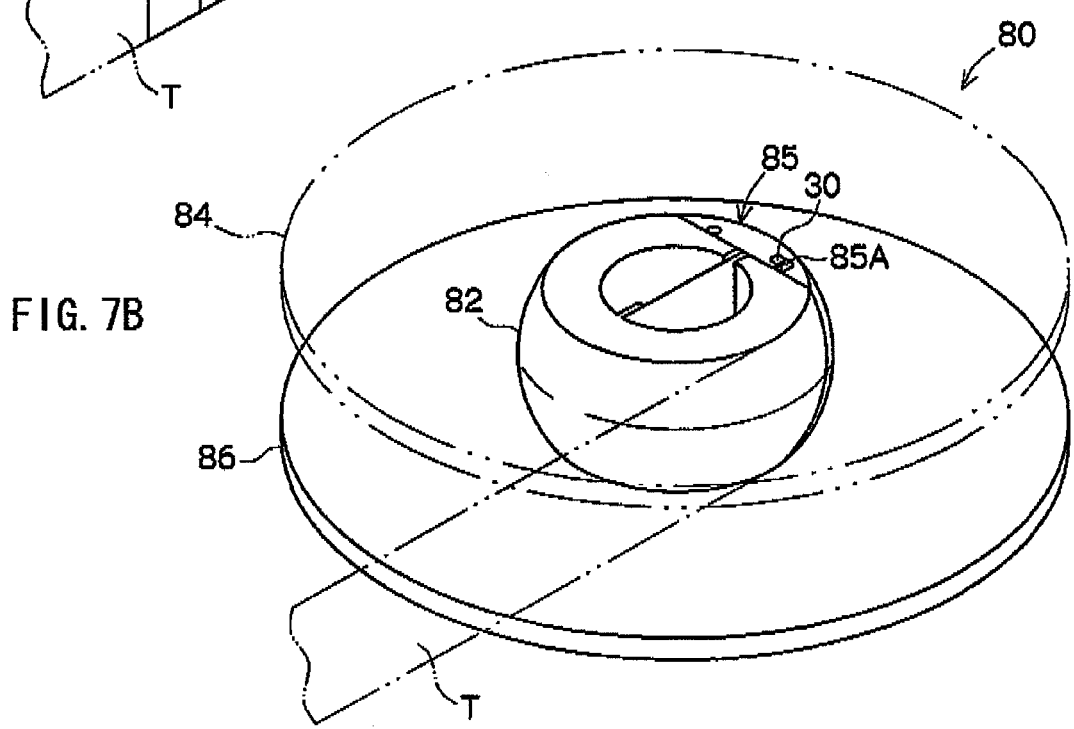
FIG. 7B is a schematic perspective view showing the structure of a leader block of a take-up reel.

Note that, as shown in FIG. 7A and FIG. 7B, a take-up surface 85B of the leader block 85 grasping and pulling out the leader pin 30, which corresponds to the outer peripheral surface of the reel hub 82, also need to be formed in a similar shape so that there is no step between the take-up surface 85B and the substantially barrel-shaped configuration of the outer peripheral surface of the reel hub 82. It is desirable that the outer diameters of the upper and lower both end portions of the reel hub 82 be the same at the upper flange 84 side and the lower flange 86 side, but do not necessarily have to be the same, and it suffices for them to be smaller than the outer diameter of the substantially central portion in the width direction.

Figure 5:
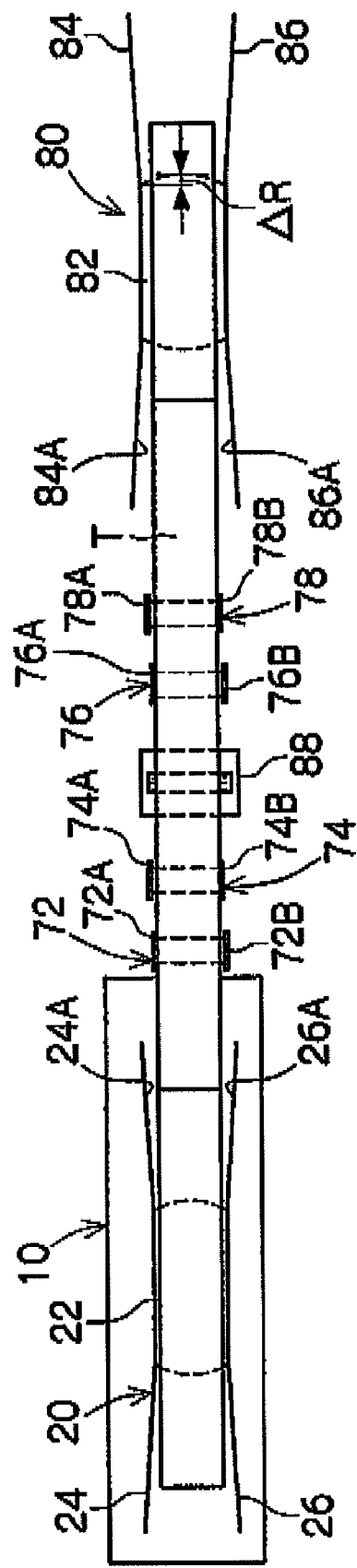
FIG. 5 is a schematic side view of the drive device after the recording tape cartridge has been loaded therein.

Further, as shown in FIG. 5, the crowning amount (convex amount) $\Delta R$, which is the difference between the radius of the maximum diameter portion (the substantially central portion in the width direction) of the reel hub 82 and the radius which is the larger of the radii of the upper and lower both end portions, is $\Delta R \leq 0.08$ mm, and preferably $\Delta R \leq 0.064$ mm. Further, the ratio J ($J=\Delta R/G$) of the crowning amount $\Delta R$ with respect to the width G of the recording tape T (and in this case is 12.65 mm) is $J \leq 0.0063$, and preferably $J \leq 0.0050$. These points as well are the same as in the case of the hub 22.

Next, operation of the recording tape cartridge 10, which has the recording tape T and the reel 20 of the above-described structure, and the drive device 70 which has the take-up reel 80, will be described. As shown in FIG. 1, at times of non-use (during storage, transporting, or the like) when the recording tape cartridge 10 having the above-described structure is not loaded in the drive device 70 (see FIG. 4 through FIG. 6), the opening 18 is closed by the door 50. When the recording tape T is to be used, the recording tape cartridge 10 is loaded into the drive device 70 along the direction of arrow A with its front wall 12A leading.

The recording tape cartridge 10 is inserted into an unillustrated bucket, and an opening/closing member (not shown) provided at the bucket (the drive device 70 side) engages with the convex portion 56 of the door 50. In this state, when the recording tape cartridge 10 moves further in the direction of arrow A, the opening/closing member moves the convex portion 56 relatively rearward against the urging force of the coil spring 58. In this way, the door 50, from which the convex portion 56 projects-out, slides rearward within the groove portions 64 and along the right wall 12B, and opens the opening 18.

When the recording tape cartridge 10 is loaded in the drive device 70 (the bucket) to a predetermined depth and the opening 18 is completely opened in this way, the bucket which is accommodating the recording tape cartridge 10 is lowered a predetermined height, and positioning members (not shown) of the drive device 70 are inserted relatively into hole portions for positioning (not shown) which are formed in the lower case 16. In this way, the recording tape cartridge 10 is positioned accurately at a predetermined position within the drive device 70, and further sliding of the door 50 (further movement of the door 50 rearward) is restricted.

Due to the movement of the recording tape cartridge 10 (the bucket) being lowered, the driving gear (not shown) relatively enters-in from the gear opening 40, meshes-together with the reel gear 44, and raises the reel 20 to a predetermined height. Then, in the state in which the driving gear and the reel gear 44 are completely meshed-together, the reel plate 46 is attracted and held by the magnetic force of an annular magnet (not shown) which is provided at the inner side of the driving gear. In this way, the reel 20 is set in a lock released state in which it can rotate relative to the case 12 within the case 12, while the meshing-together of the reel gear 44 with the driving gear is maintained.

On the other hand, the leader block 85 which is provided at the drive device 70 side enters into the case 12 from the opening 18 which has been opened, and grasps and pulls out the leader pin 30 which is positioned and held at the pin holding portions 36. Note that, because the recording tape cartridge 10 is accurately positioned within the drive device 70 at this time, the hooks 85A of the leader block 85 can reliably be made to anchor the annular grooves 32 of the leader pin 30. Further, because the rotation locked state of the reel 20 is released, the reel 20 can rotate as the leader pin 30 is pulled out.

The leader block 85, which is grasping the leader pin 30 which is pulled out from the opening 18 in this way, is attached to (accommodated at) the reel hub 82 so as to structure a portion of the reel hub 82 by the take-up reel 82 rotating as shown in FIG. 7A and FIG. 7B. Then, by rotating and driving the take-up reel 80 and the reel 20 synchronously, the recording tape T is successively pulled out from the case 12 while being taken-up onto the take-up reel 80.

At this time, the recording tape T which is pulled out from the interior of the case 12 slidingly-contacts a tape guide 72 which is disposed nearest to the recording tape cartridge 10. The tape guide 72 is supported so as to rotate freely, and is assembled such that the heightwise position thereof is offset toward the center or toward one of the upper and lower positions, e.g., toward the lower position.

Accordingly, the recording tape T which slidingly-contacts the tape guide 72 travels in a state in which the edge of the upper end thereof is restricted by an upper flange 72A of the tape guide 72. Next, the recording tape T slidingly-contacts a tape guide 74 which is supported so as to rotate freely. The tape guide 74 is assembled such that the central position thereof in the width direction (heightwise direction) is offset to a position upward of the central position of the reel hub 22 in the width direction (heightwise direction). The edge of the lower end of the recording tape T is restricted by a lower flange 74B of the tape guide 74.

Then, the recording tape T, whose position is restricted by the tape guide 74, next slidingly-contacts a tape guide 76 which is supported so as to rotate freely. Note that, before slidingly-contacting the tape guide 76, the recording tape T slidingly-contacts a recording/playback head 88. Oppositely of the tape guide 74, i.e., in the same way as the tape guide 72, the tape guide 76 is assembled such that the central position thereof in the width direction (heightwise direction) is offset to a position downward of the central position of the reel hub 22 in the width direction (heightwise direction). The edge of the upper end of the recording tape T is restricted by an upper flange 76A of the tape guide 76.

The recording tape T, whose position is restricted by the tape guide 76, then finally slidingly-contacts a tape guide 78 which is supported so as to rotate freely. In the same way as the tape guide 74, the tape guide 78 is assembled such that the central position thereof in the width direction (heightwise direction) is offset to a position upward of the central position of the reel hub 22 in the width direction (heightwise direction). The edge of the lower end of the recording tape T is restricted by a lower flange 78B of the tape guide 78.

When the heightwise positions (width direction positions) of the respective tape guides 72 through 78 within the drive device 70 differ alternately along the tape path of the recording tape T in this way, there is the advantage that restricting of the width direction (vertical direction) position of the recording tape T can be carried out suitably. Note that, because the respective tape guides 72 through 78 are each supported so as to rotate freely, the edges of the recording tape T are seldom damaged by the respective tape guides 72 through 78.

Recording or playback of information is carried out due to the recording tape T slidingly-contacting the recording/playback head 88, which is disposed between the predetermined tape guides 74, 76, while the width direction (vertical direction) position of the recording tape T is restricted by the tape guides 72 through 78. Here, the traveling speed of the recording tape T is fast, and the recording/playback head 88 is a non-rotating fixed head of which the contact angle/contact area with the recording tape T is small, and is supported so as to be able to move only in the vertical direction (the heightwise direction) by, for example, an unillustrated actuator.

That is, the recording/playback head 88 is a linear recording fixed head that is configured to be movable in the width direction of the recording tape T (the axial direction of the reel hubs 22 and 82) following servo signals S (see FIG. 6) which are provided in advance on the recording tape T and with which control of the width direction position of the recording tape T is difficult to control by the travel system of the drive device.

As shown in FIG. 6 for example, the servo signal S includes four (or five or the like) patterns P which are lined-up in parallel, and the patterns P are set in a substantially truncated V-shaped arrangement so as to form one group. A plurality of these groups of servo signals S which are formed in substantial truncated V-shapes are disposed in one line in a vicinity of each of the upper and lower end portions of the recording tape T, such that the widening sides thereof face outwardly.

It can be understood that, in accordance with such servo signals S, if the sensing time (distance) in one group of servo signals S (shown by W in FIG. 6) is long, the position of the recording tape T which is traveling is offset one of upward and downward with respect to the recording/playback head 88. Therefore, the vertical direction (heightwise direction) position of the recording/playback head 88 can be adjusted in accordance therewith.

In the present exemplary embodiment, because the reel hub 22 of the reel 20 and the reel hub 82 of the take-up reel 80 are both formed in crowning shapes (substantially barrel shape) and the upper flanges 24, 84 and the lower flanges 26, 86 are provided integrally with the reel hub 22, 82, fluctuations in the position of the recording tape T in the vertical direction (the axial direction of the reel 20 and the take-up reel 80) are suppressed suitably as will be described in detail later. Accordingly, the occurrence of errors in reading the servo signals S (servo tracking errors) and recording/playback errors of data signals (information) can be reduced.

The recording tape T, at which the recording or playback of information has been completed without errors due to the recording tape T slidingly-contacting the recording/playback head 88 while the heightwise position (width direction position) thereof is restricted by the respective tape guides 72 through 78 and the configurations of the reel hubs 22, 82 of the reel 20 and the take-up reel 80, is rewound onto the reel 20 due to the driving gear and the take-up reel 80 rotating reversely.

When the recording tape T is rewound on the reel 20 to the end and the leader pin 30 is held at the pin holding portions 36, the bucket accommodating the recording tape cartridge 10 rises a predetermined height, the positioning members (not shown) are pulled out from the hole portions for positioning (not shown), the driving gear is pulled out from the gear opening 40, and the meshing of the driving gear with the reel gear 44 is cancelled. Then, the reel 20 moves downward to its original heightwise position within the recording tape cartridge 10.

Thereafter, the recording tape cartridge 10 is moved in the direction opposite to the direction of arrow A by an unillustrated ejecting mechanism. Accompanying this movement, the door 50 slides in the direction of closing the opening 18 due to the urging force of the coil spring 58, and completely closes the opening 18 (returns to the initial state). The recording tape cartridge 10, whose opening 18 is closed in this way, is completely ejected from the drive device 70 (the bucket).

The operation and effects of the above-described reel 20 and take-up reel 80 will be described in detail next. Note that the operation and effects of the take-up reel 80 are substantially the same as the operation and effects of the reel 20. Therefore, hereinafter, only description of the reel 20 will be given, and description of the take-up reel 80 will be omitted fittingly.

As shown in FIG. 3, the reel 20 is configured as a result of the reel hub 22 being integrally molded with the lower flange 26, and the upper flange 24 being welded to the reel hub 22. That is, the upper and lower flanges 24 and 26 are integrally provided with the reel hub 22. Additionally, the outer diameter of the width direction substantially central portion of the reel hub 22 is formed larger than the outer diameters of the end portions at the upper flange 24 side and the lower flange 26 side (upper and lower both sides). That is, the reel hub 22 has a substantially barrel shape (crowning shape).

Figure 8A:
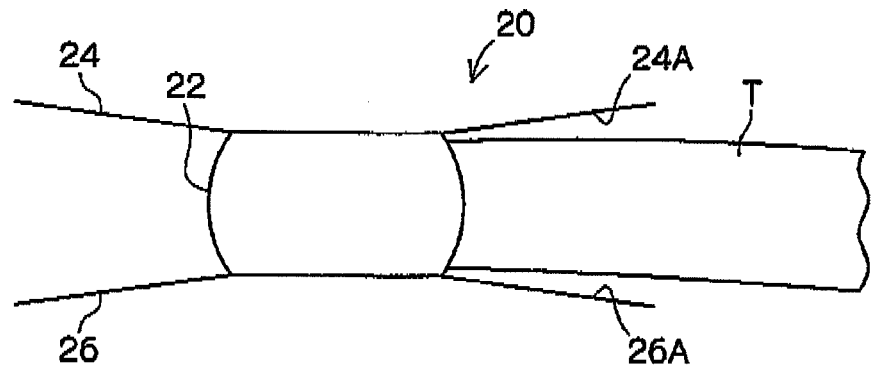
FIG. 8A is a schematic side view showing a state in which the recording tape is wound on the reel.
Figure 8B:
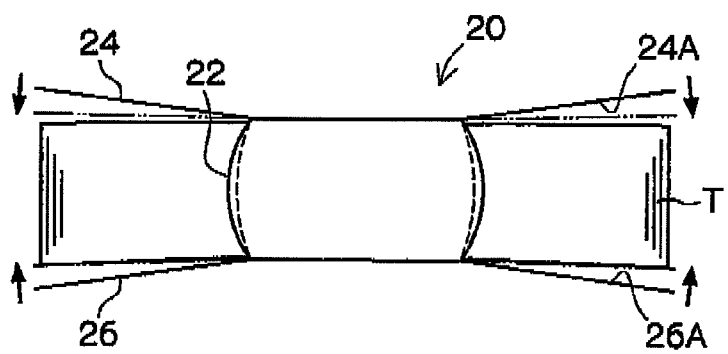
FIG. 8B is a schematic side view explaining the operation of the reel.
Figure 8C:
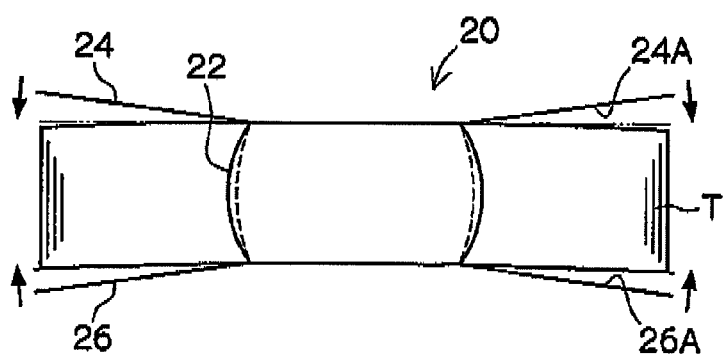
FIG. 8C is a schematic side view explaining the operation of the reel.

Additionally, as shown in FIGS. 8C to 8C, the recording tape T is wound on the reel 20. At this time, the reel hub 22 is deformed as indicated by the illustrated dashed lines by the tight-winding force F of the recording tape T gradually as the recording tape T is wound onto the reel hub 22. Further, because the upper flange 24 and the lower flange 26 are provided integrally with respect to the reel hub 22, the upper flange 24 and the lower flange 26 deform so as to narrow the flange interval gradually as the recording tape T is wound onto the reel hub 22 following the deformation of the reel hub 22 (in FIGS. 8B and 8C, this is indicated by long dashed double-short dashed lines).

Note that, because the effect of the curvature of the recording tape T is greater than the effect of the reel hub 22 configured to have a crowning shape, even in the reel 20 relating to the present exemplary embodiment, sometimes the recording tape T is set toward either one of the flanges 24 and 26 due to the curvature, and at that time, sometimes the upper and lower flanges 24 and 26 are lifted up by the recording tape T in the direction in which the flange interval becomes wider. However, even at this time, in the reel 20 relating to the present exemplary embodiment, there is the effect that tape edge damage can be reduced because strong pushing of the tape edges against the flanges 24 and 26 due to the curvature can be suppressed.

In any case, in the reel 20 relating to the present exemplary embodiment, the recording tape T is wound on the reel hub 22 so as to be set toward the width direction substantially central portion of the reel hub 22, so its regulated windability can be improved. That is, even when the recording tape T is thinned in accompaniment with an increase in recording capacity, disorder in winding of the recording tape T can be suppressed, and the amount by which a single layer (or plural layers) of the recording tape T protrudes from the wound surface, or steps form in the wound surface, can be suppressed. Below, specific experimental data establishing this will be given.

Figure 9A:
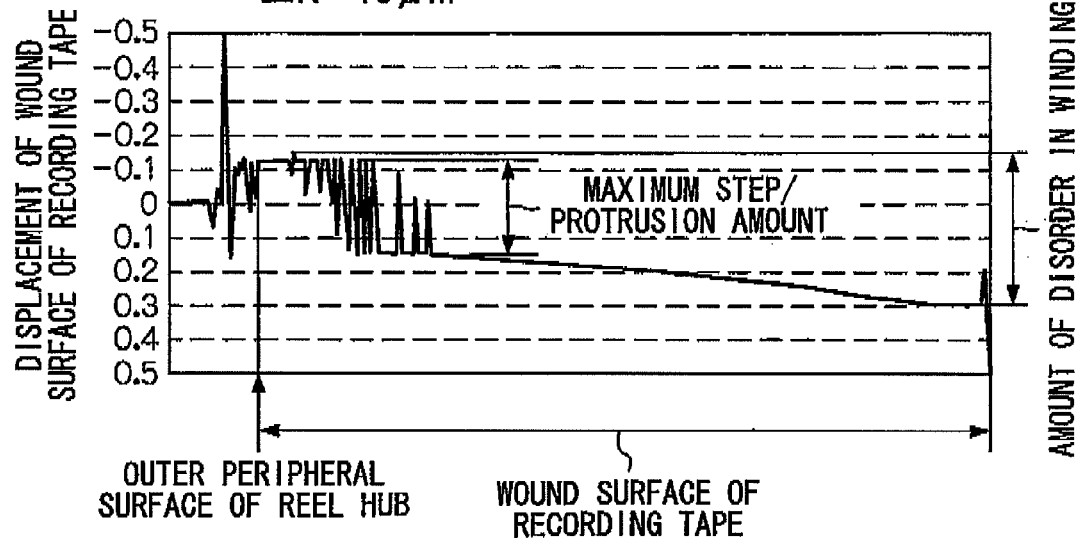
FIG. 9A is a recording tape wound posture measurement chart in a case in which $\Delta R=-16$ μm and the flange interval is a conventional interval.
Figure 9B:
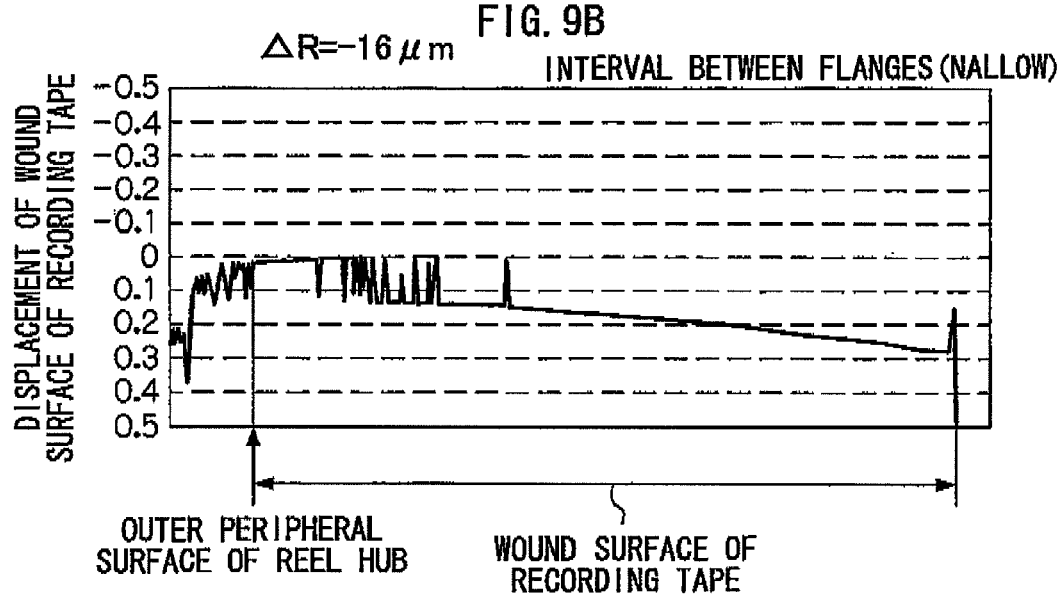
FIG. 9B is a recording tape wound posture measurement chart in a ease in which $\Delta R=-16$ μm and the flange interval is narrower than a conventional interval.
Figure 10A:
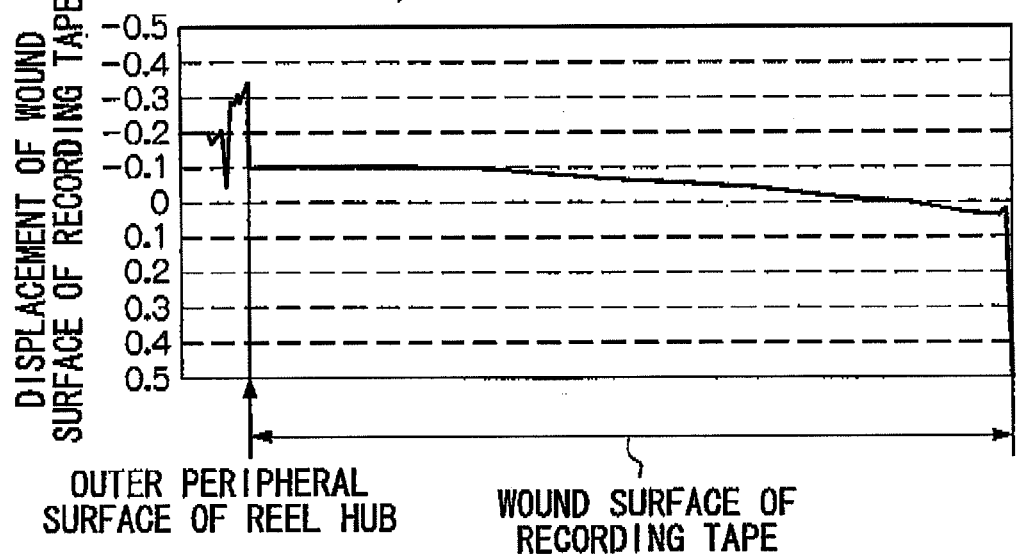
FIG. 10A is a recording tape wound posture measurement chart in a case in which $\Delta R=58$ μm and the flange interval is a conventional interval.
Figure 10B:
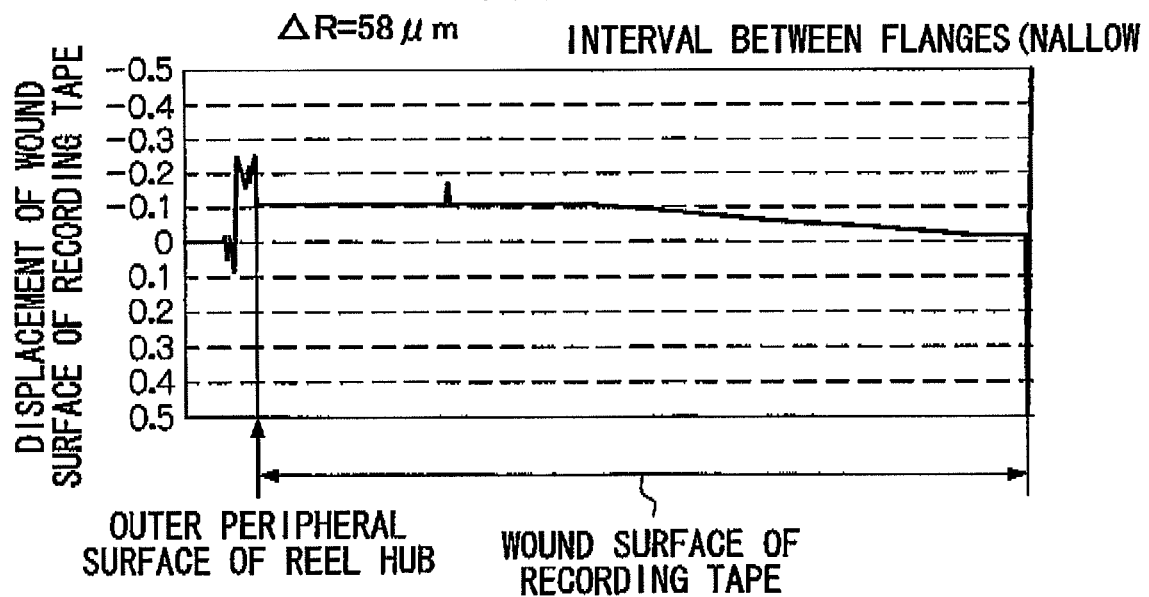
FIG. 10B is a recording tape wound posture measurement chart in a case in which $\Delta R=58$ μm and the flange interval is narrower than a conventional interval.

FIG. 9A through FIG. 10B are wound posture measurement charts showing the edge position, in the radial direction of the reel 20, of the recording tape T which is wound on the reel hub 22. Note that FIG. 9A and FIG. 10A show cases of the reel 20 in which the interval between the flanges is similar to that of a conventional reel as shown in FIG. 8B (the reel 20 in which a clearance K is K=0.30 mm, for example), and FIG. 9B and FIG. 10B show cases of the reel 20 in which the interval between the flanges is made to be more narrow than that of FIG. 8B as shown in FIG. 8C (the reel 20 in which a clearance K is K=0.10 mm to 0.18 mm).

Further, FIG. 9A and FIG. 9B show cases in which the recording tape T is wound on a conventional reel hub (not shown) which is not formed in a crowning shape (is actually slightly hourglass-shaped, and when expressing a hourglass shape as negative with respect to a barrel shape, ΔR=−16 μm). FIG. 10A and FIG. 10B show cases in which the recording tape T is wound on the reel hub 22 whose crowning amount ΔR is ΔR=58 μm. Note that the "maximum step/protrusion amount" shown in FIG. 9A for example is the maximum value of either of the step or the protrusion amount of the wound posture measurement chart, and is the maximum value of the amount of change by which the recording tape T protrudes locally from the overall wound surface. Further, "amount of disorder in winding" is an amount computed by subtracting the minimum value from the maximum value of the wound posture measurement chart, and includes steps, protrusion, tilting of the wound surface, and the like.

Figure 11:
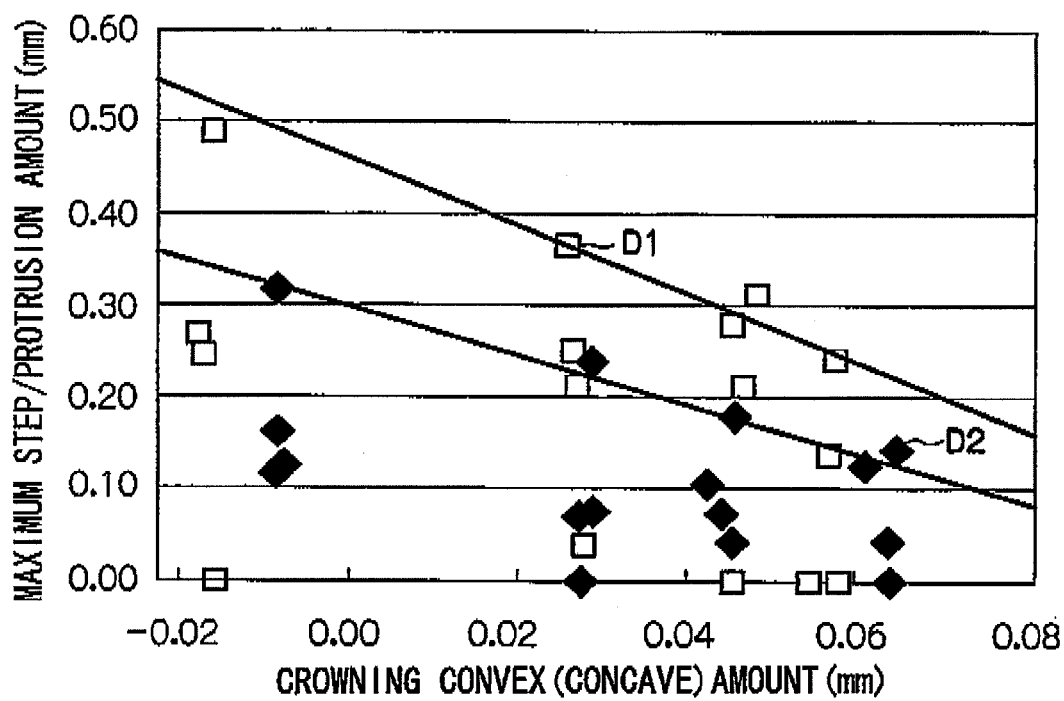
FIG. 11 is a graph showing the relationship between a crowning amount and a maximum step/protrusion amount.

FIG. 11 is a graph showing the relationship between the crowning amount (convex amount) ΔR and the maximum step/protrusion amount. Namely, the crowning amount (convex amount) ΔR is on the horizontal axis, and the maximum step/protrusion amount is on the vertical axis. Further, the white, square dot D1 shows the case of the reel 20 whose interval between flanges is similar to that of the conventional reel as shown in FIG. 8B (the reel 20 in which a clearance K is K=0.30 mm, for example). The black, diamond-shaped dot D2 shows the case of the reel 20 in which the interval between the flanges is made to be more narrow than that of FIG. 8B as shown in FIG. 8C (the reel 20 in which the clearance K is K=0.10 mm to 0.18 mm).

Following Table 1 shows reduced values of the maximum step/protrusion amount in accordance with changes in the crowning amount (convex amount) ΔR, and the reduced values of the maximum step/protrusion amount in accordance with differences in the interval between the flanges (for the interval between the flanges of a first reel, the clearance K is, for example, K=0.30 mm), respectively in cases which are based on the maximum step/protrusion amount at the reel hub of the first reel (not shown) which is not formed in a crowning shape (is actually slightly hourglass-shaped, and when expressing a hourglass shape as negative with respect to a barrel shape, ΔR=−16 μm), and the maximum step/protrusion amount at the reel hub of a second reel (not shown) which is not formed in a crowning shape (is actually slightly hourglass-shaped, and when expressing a hourglass shape as negative with respect to a barrel shape, ΔR=−8 μm) and at which the interval between the flanges is made to be narrow (the clearance K is, for example, K=0.15 mm).

The following can be understood from the results of FIG. 9A through FIG. 11 and Table 1. Namely, even if the interval between the flanges is wide (even if K=0.30 mm) as is the case with the conventional reel, if there is even a slit crowning amount ΔR (e.g., even if ΔR≦0.064 mm (64 μm)), the interval between the flanges can be narrowed well by the deformation of the reel hub 22 due to the tight-winding of the recording tape T. Therefore, the maximum step/protrusion amount and the amount of disorder in winding can be sufficiently reduced. Further, at the reel 20 at which the interval between the flanges is made narrow from the start (K=0.15 mm), the effect can be even further improved.

In this way, at the reel 20 at which the upper and lower flanges 24, 26 are provided integrally with the reel hub 22, if a crowning shape (substantial barrel shape) is given to the reel hub 22, even if the crowning amount (convex amount) ΔR is rather small (ΔR≦0.08 mm, see FIG. 11), the step or protrusion amount of the wound surface (amount of disorder in winding) of the recording tape T can be made to be much smaller. This is because, at the reel 20 relating to the present exemplary embodiment, as the reel hub 22 deforms due to tight-winding of the recording tape T, the upper and lower flanges 24, 26 deform such that the interval therebetween narrows.

That is, according to the reel 20 relating to the present exemplary embodiment, as shown in FIGS. 10A and 10B and Table 1, by prescribing the thickness of the recording tape T, the distance between the upper and lower flanges 24 and 26, the swelling amount of the barrel shape, and the like, it becomes possible to sufficiently realize a state in which the amount of disorder in winding is small, within a swelling range smaller than that of conventional techniques, not only because of the effect of the substantially barrel shape of the reel hub 22 itself, but also because of the synergetic effect of the deformation of the upper and lower flanges 24 and 26 (deformation where the flange interval becomes narrower) that is linked to the deformation of the reel hub 22.

As described above, at the reel 20 relating to the present exemplary embodiment, it is proved that there are effects even if the crowning amount ΔR is ΔR≦0.08 mm (80 μm), and preferably, ΔR≦0.064 mm (64 μm). However, it has been empirically confirmed that, if ΔR<0.007 mm (7 μm), or, expressed in terms of the ratio J, if J<0.00055, there is the concern that the effect of guiding the recording tape T to the substantially central portion in the width direction of the reel hub 22 will be small.

Further, it has been empirically confirmed that, if the crowning amount ΔR is ΔR>0.08 mm (80 μm), or, expressed in terms of the ratio J, if J>0.0063, there is an increased probability that, at the wound surface of the recording tape T

TABLE 1

| reel + convex amount ΔR (μm) | maximum step/protrusion amount (mm) | difference with first reel (ΔR = −16 μm, K = 0.30 mm) | difference with second reel (ΔR = −8 μm, K = 0.15 mm) | state of wound surface* |
|---|---|---|---|---|
| First Reel | 0.487 | | | |
| + convex amount 27-30 | 0.368 | 0.119 (−24%) | | A |
| + convex amount 46-49 | 0.310 | 0.177 (−36%) | | A |
| + convex amount 55-64 | 0.242 | 0.245 (−50%) | | A |
| Second Reel | 0.323 | 0.164 (−33%) | | A |
| + convex amount 27-30 | 0.238 | 0.294 (−60%) | 0.085 (−26%) | A |
| + convex amount 46-49 | 0.184 | 0.303 (−62%) | 0.139 (−43%) | A |
| + convex amount 55-64 | 0.140 | 0.347 (−71%) | 0.183 (−57%) | A |

*A: good (no cinching, radiating), B: poor (cinching and radiating exhibited)

in a vicinity of the outer peripheral surface of the reel hub 22, plastic deformation of the recording tape T itself which is called radiating, cinching, undulating, or the like, or gaps between the layers of the recording tape T, will arise at the reel 20 at which the upper and lower flanges 24, 26 are provided integrally with the reel hub 22.

Moreover, in the range in which the crowning amount $\Delta R$ is 0.064 mm (64 µm) $<\Delta R \leqq 0.08$ mm (80 µm), or, expressed in terms of the ratio J, $0.0050 < J \leqq 0.063$, there is no particular problem, but it is easy to be affected by the thickness of the recording tape T and the rigidity of the reel hub 22. In order to reliably ensure the quality of the tape edges, it is preferable that $\Delta R \leqq 0.064$ mm (64 µm), or, expressed in terms of the ratio J, $J \leqq 0.0050$.

Note that the numerical figures in these experimental data are a case in which the thickness of the recording tape T is less than or equal to 7.5 µm. If the recording tape T is thicker, these numerical figures also will change. In a case in which a recording tape T of a thickness of at least 6.6 µm was wound on a reel hub 22 which was made of 10% glass fiber reinforced PC resin and had a wall thickness of 2.5 µm, radiating and the like did not arise at the wound surface when the crowning amount $\Delta R$ was to around $\Delta R=0.08$ mm. However, it has been empirically confirmed that, when greater than that, deformation in an undulating shape, cinching, and the like arose. In this way, the thickness of the recording tape T being thin has a high possibility of affecting the occurrence of deformation in an undulating shape and cinching.

Further, in accordance with the reel 20 relating to the present exemplary embodiment, at times of winding the recording tape T on the reel hub 22 (including the time of manufacturing the reel 20 and times of rewinding the recording tape T to remove it from the drive device 70), the recording tape T can be wound so as to be set toward the substantially central portion in the width direction of the reel hub 22, and the maximum step/protrusion amount and the amount of disorder in winding can be reduced. Therefore, even if an impact is applied to the recording tape cartridge 10 (the reel 20) at the time of being transported or at the time of being handled, the occurrence of the problem of the edges of the recording tape T being bent (tape edge damage) can be prevented. Especially, at the reel 20 relating to the present exemplary embodiment, it is possible to reduce the frequency of occurrence of the protruding of a single layer (or plural layers) of the recording tape T. Therefore, even if the recording tape T is made to be thin (e.g., even if it is made to be 6.6 µm), tape edge damage can be prevented from occurring.

When the drive device 70 causes the recording tape T to travel, the recording tape T travels in a state of being set toward the substantially central portion in the width direction of the reel hub 82 of the take-up reel 80. Therefore, the traveling position of the recording tape T, which is drawn-out from the reel 20, can be stabilized at the appropriate position. Namely, positional fluctuations in the vertical direction (the axial direction of the reel hub 82) while the recording tape T is traveling can be suppressed.

Accordingly, tape edge damage, such as bending of the edges or the like which arises due to contact with the tape guides 72 through 78 or the flanges 84, 86 of the take-up reel 80 provided at the drive device 70, or with the flanges 24, 26 of the reel 20, as well as generation of abraded powder due thereto, can be prevented. In particular, abraded powder may not only stick to the recording tape T and cause errors and drop-out, but also may stick to the recording/playback head 88 and cause more serious trouble. Therefore, it is extremely effective to be able to prevent this.

Accordingly, even if the recording/playback of information is carried out by the recording/playback head 88 which is not a rotating head but a (non-rotating) fixed head, and even at high-density-recording drive devices 70, the occurrence of errors in reading the servo signals S (servo tracking errors) and recording/playback errors of data signals (information) can be reduced. In addition, position error signals and off-tracking can be reduced.

In the present exemplary embodiment, the recording tape T with positive curvature such as shown in FIG. 8A is used, but it has been empirically confirmed that the same effects can be obtained even if a recording tape with negative curvature is used. The recording tape T ordinarily curves in its width direction (vertical direction), and in the present exemplary embodiment, the case of curving upward is negative curvature and the case of curving downward is positive curvature.

Further, it has been empirically confirmed that the same effects are obtained even when the recording tape T is reversed and wound on the reel 20 (the reel hub 22). That is, the effects of the substantially barrel-shaped reel hub 22, namely, stabilization of traveling position fluctuation in the width direction of the recording tape T and winding the recording tape T so as to be set toward the substantially central portion of the reel hub 22, are the same, even if the front and back faces of the recording tape T are reversed and the recording tape T is wound on the reel hub 22, so it is effective regardless of whether cupping is positive or negative.

In addition, in the present exemplary embodiment, the reel hub 22 and the lower flange 26 are integrally molded, but the reel hub 22 and the upper flange 24 may also be integrally molded, and moreover, the reel hub 22, the upper flange 24 and the lower flange 26 may also be integrally molded. Further, the present exemplary embodiment is an example which is applied to the recording tape cartridge 10 which is configured so as to accommodate the single reel 20 within the case 12. However, the present invention is not limited to this and may be applied to, for example, a two-reel recording tape cassette in which two reels are accommodated within a case.

The present invention provides a tape reel, a recording tape cartridge, a take-up reel, a pullout member, and a drive device that can control fluctuation of recording tape in the axial direction of a hub and can, even when the recording tape is thinned in accompaniment with an increase in recording capacity, prevent the occurrence of tape edge damage.

A first aspect of the present invention provides a tape reel comprising: a hub on which is wound a recording tape on which is recorded a servo signal that is a reference for tracking by a recording/playback head of a drive device; and flanges provided integrally at both end portions of the hub, wherein a diameter of a substantially central portion of the hub is formed larger than diameters of each of the end portions of the hub.

According to the above-described aspect, the pair of flanges are provided integrally with respect to the hub, so the pair of flanges deform so as to narrow the flange interval by deformation of the hub resulting from the tight-winding of the recording tape, and the diameter of the substantially central portion of the hub is formed larger than the diameters of each of the end portions of the hub, so the recording tape is wound on the hub so as to be set toward the substantially central portion of the hub. Consequently, even when the recording tape is thinned in accompaniment with an increase in recording capacity, disorder in winding of the recording tape can be suppressed and regulated windability can be improved.

That is, because of this, the amount by which a single layer (or plural layers) of the recording tape protrudes from the wound surface in a state in which it is wound on the reel, or steps form in the wound surface, can be suppressed, so even if an impact is applied during transport or during handling, the occurrence of the problem of the edges of the recording tape being bent (tape edge damage) can be prevented. By "integrally" here means a configuration where deformation of the hub and deformation of the flanges are linked to/affect each other. That is, this means a configuration where the flanges deform in accompaniment with deformation of the hub or where the hub deforms in accompaniment with deformation of the flanges. Specific examples include an instance where the hub and the flanges are integrally molded and an instance where the flanges are welded to the hub.

Further, the recording tape is wound so as to be set toward the substantially central portion of the hub, so the traveling position of the recording tape unreeled from the reel can be stabilized. Consequently, during travel inside a drive device, the positional fluctuation of the recording tape in the axial direction of the hub (the direction orthogonal to the traveling direction of the recording tape) can be suppressed, and tape edge damage occurring as a result of contact with tape guides or flanges of a take-up reel disposed in the drive device and moreover with flanges of the tape reel can be prevented. Thus, even at a high-density-recording drive device, the occurrence of errors in reading servo signals and recording/playback errors of data signals can be reduced, and position error signals and off-tracking can be reduced.

In the above-described aspect, a thickness of the recording tape may be less than or equal to 7.5 µm.

According to the above-described aspect, even when the thickness of the recording tape is less than or equal to 7.5 µm, positional fluctuation of the recording tape in the axial direction of the hub (the direction orthogonal to the traveling direction of the recording tape) can be suppressed, and the occurrence of tape edge damage can be prevented. Note that when the thickness of the recording tape is less than or equal to 6.9 µm, the rigidity of the recording tape drops, so the effect is remarkable.

In the above-described aspect, a clearance obtained by subtracting a width of the recording tape from the flange interval at an outer peripheral surface of the hub may be greater than or equal to 0.10 mm and less than or equal to 0.18 mm.

According to the above-described aspect, the interval between the flanges can be narrowed well by deformation of the hub resulting from the tight-winding of the recording tape. Consequently, a state in which the amount of disorder in winding is small can be realized, and the traveling position of the recording tape can be stabilized at the appropriate position. Note that when the clearance is greater than 0.138 mm, the step and protrusion amount of the wound surface become greater, and even when the clearance is less than 0.10 mm to about 0.05 mm, the effect is expected, but when the clearance is less than or equal to 0.05 mm, the potential for the flanges to contact a member for adhesion when the recording tape is adhered to the hub is large, and implementation in actual process becomes difficult.

In the above-described aspect, a ratio of a difference between a larger radius of radii of both end portions of the hub, and a radius of the substantially central portion of the hub, with respect to a width of the recording tape may be less than or equal to 0.0063.

According to the above-described aspect, even when the difference between the larger radius of radii of both end portions of the hub and the radius of the substantially central portion of the hub is slight, the interval between the pair of flanges is narrowed in accompaniment with deformation of the hub resulting from the tight-winding of the recording tape, so the recording tape can be wound on the substantially central portion of the hub. Consequently, the occurrence of tape edge damage can be prevented. Note that the width of the recording tape is a standard value and a median of a tolerance width relating to the tape width of the recording tape at the drive device in which this recording tape is used. Further, it is preferable that the ratio of the difference between the larger of the radii of the both end portions of the hub, and the radius of the substantially central portion of the hub, with respect to the width of the recording tape be less than or equal to 0.0050.

In the above-described aspect, a width of the recording tape may be approximately 12.65 mm, and a difference between a larger radius of radii of both end portions of the hub, and a radius of the substantially central portion of the hub, may be less than or equal to 0.08 mm.

According to the above-described aspect, even when the difference between the larger radius of radii of both end portions of the hub and the radius of the substantially central portion of the hub is slight, the interval between the pair of flanges is narrowed in accompaniment with deformation of the hub resulting from the tight-winding of the recording tape, so the recording tape can be wound on the substantially central portion of the hub. Consequently, the occurrence of tape edge damage can be prevented. Note that the difference between the larger of the radii of the both end portions of the hub, and the radius of the substantially central portion of the hub is preferably less than or equal to 0.064 mm. If the difference is greater than 0.08 mm, damage would arise at the tape edges. Within a range of greater than 0.064 mm to less than or equal to 0.08 mm, there were no particular problems in the above-described examples, but there is the possibility of being easily affected by the thickness of the recording tape and the rigidity of the hub. It is preferable that the difference is less than or equal to 0.064 mm in order to reliably ensure the quality of the tape edges.

In the above-described aspect, a recording tape used in a drive device where the recording/playback head is a non-rotating head that follows the servo signal may be used.

According to the above-described aspect because positional fluctuation in the width direction of the recording tape can be suppressed, the present invention is effective with respect to a drive device disposed with a recording/playback head configured as a linear recording non-rotating head that is movable in the width direction of the recording tape following servo signals and whose contact angle/contact area with the recording tape is small and with which it is difficult to control fluctuation in the width direction of the recording tape by its head portion.

A second aspect of the present invention provides a recording tape cartridge comprising: the tape reel of the first aspect; and a case accommodating the tape reel rotatably.

According to the above-described aspect, substantially the same effects as the effects of the first aspect can be obtained at the recording tape cartridge. In particular, in order to increase the recording capacity per recording tape cartridge, there has been the trend to make the recording tape thinner. Accordingly, the rigidity of the recording tape is reduced, and the strength of the tape edges also is reduced. However, because the recording tape is difficult to hit the flanges and the like as described above, tape edge damage due to the recording tape hitting the flanges or the like, and the frequency of occurrence of protruding of a single layer or plural layers which starts due to the recording tape hitting the flanges or the like, can be kept small.

In the above-described aspect the tape reel may be a single tape reel.

According to the above-described aspect, at the reel, the regulated windability of the recording tape can be improved and positional fluctuations in the axial direction (the direction orthogonal to the traveling direction of the recording tape) of the hub at the time when the recording tape travels can be suppressed, so that the fluctuations in the width direction (the direction orthogonal to the traveling direction of the recording tape) of the recording tape fluctuated by the take-up reel at the drive device side, which are difficult to make highly-accurate, can be suppressed at the reel at the cartridge side. Therefore, the present invention is suited to single-reel recording tape cartridges for data back-up of computers for which a high recording capacity is desired.

A third aspect of the present invention provides a take-up reel provided within a drive device and on which is wound a recording tape pulled out from a recording tape cartridge, the take-up reel comprising: a hub on which is wound a recording tape on which is recorded a servo signal that is a reference for tracking by a recording/playback head of a drive device; and flanges provided integrally at both end portions of the hub, wherein a diameter of a substantially central portion of the hub is formed larger than diameters of each of the end portions of the hub.

According to the above-described aspect, substantially the same effects as the effects of the first aspect can be obtained at the take-up reel. That is, the pair of flanges are provided integrally with respect to the hub, so the pair of flanges deform so as to narrow the flange interval by deformation of the hub resulting from the tight-winding of the recording tape, and the diameter of the substantially central portion of the hub is formed larger than the diameters of each of the end portions of the hub, so the recording tape is wound on the hub so as to be set toward the substantially central portion of the hub. Consequently, even when the recording tape is thinned in accompaniment with an increase in recording capacity, disorder in winding of the recording tape can be suppressed and the regulated windability can be improved.

That is, because of this, the amount by which a single layer (or plural layers) of the recording tape protrudes from the wound surface in a state in which it is wound on the reel, or steps form in the wound surface, can be suppressed, so the occurrence of the problem of the edges of the recording tape being bent (tape edge damage) can be prevented. By "integrally" here means a configuration where deformation of the hub and deformation of the flanges are liked to/affect each other. That is, this means a configuration where the flanges deform in accompaniment with deformation of the hub or where the hub deforms in accompaniment with deformation of the flanges. Specific examples include an instance where the hub and the flanges are integrally molded and an instance where the flanges are welded to the hub.

Further, the recording tape is wound so as to be set toward the substantially central portion of the hub, so, during travel inside a drive device, the positional fluctuation of the recording tape in the axial direction of the hub (the direction orthogonal to the traveling direction of the recording tape) can be suppressed. Consequently, tape edge damage occurring as a result of contact with tape guides or flanges of a take-up reel disposed in the drive device and moreover with flanges of the tape reel can be prevented. Thus, even at a high-density-recording drive device, the occurrence of errors in reading servo signals and recording/playback errors of data signals can be reduced, and position error signals and off-tracking can be reduced.

In the above-described aspect, a thickness of the recording tape may be less than or equal to 7.5 μm.

According to the above-described aspect, substantially the same effects as the effects of the first aspect can be obtained at the take-up reel. That is, even when the thickness of the recording tape is less than or equal to 7.5 μm, positional fluctuation of the recording tape in the axial direction of the hub (the direction orthogonal to the traveling direction of the recording tape) can be suppressed, and the occurrence of tape edge damage can be prevented. Note that when the thickness of the recording tape is less than or equal to 6.9 μm, the rigidity of the recording tape drops, so the effect is remarkable.

In the above-described aspect, a clearance obtained by subtracting a width of the recording tape from the flange interval at an outer peripheral surface of the hub may be greater than or equal to 0.10 mm and less than or equal to 0.18 mm.

According to the above-described aspect, substantially the same effects as the effects of the first aspect can be obtained at the take-up reel. That is, the interval between the flanges can be narrowed well by deformation of the hub resulting from the tight-winding of the recording tape. Consequently, a state in which the amount of disorder in winding is small can be realized, and the traveling position of the recording tape can be stabilized at the appropriate position.

In the above-described aspect, a ratio of a difference between a larger radius of radii of both end portions of the hub, and a radius of the substantially central portion of the hub, with respect to a width of the recording tape may be less than or equal to 0.0063.

According to the above-described aspect, substantially the same effects as the effects of the first aspect can be obtained at the take-up reel. That is, even when the difference between the larger radius of radii of both end portions of the hub and the radius of the substantially central portion of the hub is slight, the interval between the pair of flanges is narrowed in accompaniment with deformation of the hub resulting from the tight-winding of the recording tape, so the recording tape can be wound on the substantially central portion of the hub. Consequently, the occurrence of tape edge damage can be prevented. Note that the width of the recording tape is a standard value and a median of a tolerance width relating to the tape width of the recording tape at the drive device in which this recording tape is used. Further, it is preferable that the ratio of the difference between the larger of the radii of the both end portions of the hub, and the radius of the substantially central portion of the hub, with respect to the width of the recording tape be less than or equal to 0.0050.

In the above-described aspect, a width of the recording tape may be approximately 12.65 mm, and a difference between a larger radius of radii of both end portions of the hub, and a radius of the substantially central portion of the hub, may be less than or equal to 0.08 mm.

According to the above-described aspect, substantially the same effects as the effects of the first aspect can be obtained at the take-up reel. That is, even when the difference between the larger radius of radii of both end portions of the hub and the radius of the substantially central portion of the hub is slight, the interval between the pair of flanges is narrowed in accompaniment with deformation of the hub resulting from the tight-winding of the recording tape, so the recording tape can be wound on the substantially central portion of the hub. Consequently, the occurrence of tape edge damage can be prevented. Note that the difference between the larger of the radii of the both end portions of the hub, and the radius of the substantially central portion of the hub is preferably less than or equal to 0.064 mm. If the difference is greater than 0.08 mm, damage would arise at the tape edges. Within a range of greater than 0.064 mm to less than or equal to 0.08 mm, there were no particular problems in the above-described examples, but there is the possibility of being easily affected by the thickness of the recording tape and the rigidity of the hub. It is preferable that the difference is less than or equal to 0.064 mm in order to reliably ensure the quality of the tape edges.

A fourth aspect of the present invention provides a pullout member that pulls out a recording tape from a recording tape cartridge, is accommodated in a hub of the take-up reel of the third aspect, and comprises a take-up surface that configures part of an outer peripheral surface of the hub, wherein a diameter of a substantially central portion of the take-up surface is formed larger than diameters of each of the end portions of the take-up surface.

According to the above-described aspect, because the diameter of the substantially central portion of the take-up surface of the pullout member which configures part of an outer peripheral surface of the hub of the take-up reel is formed larger than the diameters of each of the end portions of the take-up surface, substantially the same effects as the effects of the third aspect can be obtained.

A fifth aspect of the present invention provides a drive device in which a recording tape cartridge is loaded, comprising: the take-up reel of the third aspect on which is wound a recording tape pulled out from the recording tape cartridge; and a recording/playback head.

According to the above-described aspect, substantially the same effects as the effects of the third aspect can be obtained at the drive device.

In the above-described aspect, the drive device may further comprise the pullout member of the fourth aspect.

According to the above-described aspect, substantially the same effects as the effects of the fourth aspect can be obtained at the drive device.

In the above-described aspect, the recording/playback head may be a non-rotating head that follows the servo signal.

According to the above-described aspect, because positional fluctuation in the width direction of the recording tape can be suppressed, the present invention is effective with respect to a drive device disposed with a recording/playback head configured as a linear recording non-rotating head that is movable in the width direction of the recording tape following servo signals and whose contact angle/contact area with the recording tape is small and with which it is difficult to control fluctuation in the width direction of the recording tape by its head portion. In contrast, in a helical scan rotating head, the contact angle/contact area with the recording tape is large and the traveling speed of the recording tape is also slow, so control of the width direction position of the recording tape is relatively easy in comparison to a non-rotating head, and is relatively easy at the travel system side of the drive device.

As described above, the present invention can provide a tape reel, a recording tape cartridge, a take-up reel, a pullout member, and a drive device that can control fluctuation of recording tape in the axial direction of a hub and can, even when the recording tape is thinned in accompaniment with an increase in recording capacity, prevent the occurrence of tape edge damage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tape reel comprising:
   a hub on which is wound a recording tape on which is recorded a servo signal that is a reference for tracking by a recording/playback head of a drive device, a thickness of the recording tape is less than or equal to 7.5 µm and one end of the hub is open; and
   a first flange provided integrally at one end portion of the hub,
   a second flange provided integrally at the other end portion of the hub,
   wherein a diameter of a substantially central portion of the hub is formed larger than diameters of each of the end portions of the hub,
   the first flange and the second flange are configured to deform so as to narrow the flange interval according to deformation of the hub as the recording tape is wound onto the hub,
   a clearance obtained by subtracting a width of the recording tape from the flange interval at an outer peripheral surface of the hub is greater than or equal to 0.10 mm and less than or equal to 0.18 mm, and
   a ratio of a difference between a larger radius of radii of both end portions of the hub and a radius of the substantially central portion of the hub, with respect to a width of the recording tape is greater than or equal to 0.00055 and less than or equal to 0.0063.

2. The tape reel of claim 1, wherein a recording tape used in a drive device where the recording/playback head is a non-rotating head that follows the servo signal is used.

3. A recording tape cartridge comprising:
   the tape reel of claim 1; and
   a case accommodating the tape reel rotatably.

4. The recording tape cartridge of claim 3, wherein the tape reel is a single tape reel.

5. A tape reel comprising:
   a hub on which is wound a recording tape on which is recorded a servo signal that is a reference for tracking by a recording/playback head of a drive device, a width of the recording tape is approximately 12.65 mm, a thickness of the recording tape is less than or equal to 7.5 µm, and one end of the hub is open; and
   a first flange provided integrally at one end portion of the hub,
   a second flange provided integrally at the other end portion of the hub,
   wherein a diameter of a substantially central portion of the hub is formed larger than diameters of each of the end portions of the hub,
   the first flange and the second flange are configured to deform so as to narrow the flange interval according to deformation of the hub as the recording tape is wound onto the hub,
   a clearance obtained by subtracting a width of the recording tape from the flange interval at an outer peripheral surface of the hub is greater than or equal to 0.10 mm and less than or equal to 0.18 mm, and
   a width of the recording tape is approximately a difference between a larger radius of radii of both end portions of the hub, and a radius of the substantially central portion of the hub, is greater than or equal to 0.007 mm and less than or equal to 0.08 mm.

6. A take-up reel provided within a drive device and on which is wound a recording tape pulled out from a recording tape cartridge, the take-up reel comprising:
- a hub on which is wound a recording tape on which is recorded a servo signal that is a reference for tracking by a recording/playback head of a drive device, a thickness of the recording tape is less than or equal to 7.5 μm, and one end of the hub is open; and
- a first flange provided integrally at one end portion of the hub,
- a second flange provided integrally at the other end portion of the hub,
- wherein a diameter of a substantially central portion of the hub is formed larger than diameters of each of the end portions of the hub,
- the first flange and the second flange are configured to deform so as to narrow the flange interval according to deformation of the hub as the recording tape is wound onto the hub,
- a clearance obtained by subtracting a width of the recording tape from the flange interval at an outer peripheral surface of the hub is greater than or equal to 0.10 mm and less than or equal to 0.18 mm, and
- a ratio of a difference between a larger radius of radii of both end portions of the hub and a radius of the substantially central portion of the hub, with respect to a width of the recording tape is greater than or equal to 0.00055 and less than or equal to 0.0063.

7. A pullout member that pulls out a recording tape from a recording tape cartridge, is accommodated in a hub of the take-up reel of claim 6, and comprises a take-up surface that configures part of an outer peripheral surface of the hub, wherein a diameter of a substantially central portion of the take-up surface is formed larger than diameters of each of the end portions of the take-up surface.

8. A drive device in which a recording tape cartridge is loaded, comprising:
- the take-up reel of claim 6 on which is wound a recording tape pulled out from the recording tape cartridge; and
- a recording/playback head.

9. The drive device of claim 8, further comprising the-a pullout member of claim 7.

10. The drive device of claim 8, wherein the recording/playback head is a non-rotating head that follows the servo signal.

11. A take-up reel provided within a drive device and on which is wound a recording tape pulled out from a recording tape cartridge, the take-up reel comprising:
- a hub on which is wound a recording tape on which is recorded a servo signal that is a reference for tracking by a recording/playback head of a drive device, a width of the recording tape is approximately 12.65 mm, a thickness of the recording tape is less than or equal to 7.5 μm, and one end of the hub is open; and
- a first flange provided integrally at one end portion of the hub,
- a second flange provided integrally at the other end portion of the hub,
- wherein a diameter of a substantially central portion of the hub is formed larger than diameters of each of the end portions of the hub,
- the first flange and the second flange are configured to deform so as to narrow the flange interval according to deformation of the hub as the recording tape is wound onto the hub,
- a clearance obtained by subtracting a width of the recording tape from the flange interval at an outer peripheral surface of the hub is greater than or equal to 0.10 mm and less than or equal to 0.18 mm, and
- a difference between a larger radius of radii of both end portions of the hub, and a radius of the substantially central portion of the hub, is greater than or equal to 0.007 mm and less than or equal to 0.08 mm.

\* \* \* \* \*